US008090000B2

(12) United States Patent (10) Patent No.: US 8,090,000 B2
Hamamura (45) Date of Patent: Jan. 3, 2012

(54) COMMUNICATION SYSTEM AND ITS METHOD

(75) Inventor: Masanori Hamamura, Kami (JP)

(73) Assignee: Kochi University of Technology, Kochi (JP)

(\*) Notice: Subject to any disclaimer, the term of this patent is extended or adjusted under 35 U.S.C. 154(b) by 0 days.

(21) Appl. No.: 12/770,281

(22) Filed: Apr. 29, 2010

(65) Prior Publication Data

US 2011/0211615 A1 Sep. 1, 2011

(30) Foreign Application Priority Data

Feb. 26, 2010 (JP) ................................. 2010-042252

(51) Int. Cl.
*H04B 1/00* (2006.01)
(52) U.S. Cl. ........ 375/130; 375/132; 375/133; 375/135; 375/136; 375/146; 375/147; 375/219; 375/220; 375/260; 375/267; 375/299; 375/340; 375/347
(58) Field of Classification Search .................. 375/130, 375/146, 147, 219, 220, 132–136, 260, 267, 375/299, 340, 347
See application file for complete search history.

(56) References Cited

U.S. PATENT DOCUMENTS

| 6,580,748 | B1 | 6/2003 | Muraoka |
| 6,937,558 | B2 | 8/2005 | Wakutsu |
| 7,620,099 | B2 | 11/2009 | Hahm et al. |
| 2010/0183048 | A1* | 7/2010 | Hamamura et al. .......... 375/130 |

FOREIGN PATENT DOCUMENTS

| JP | 09-298495 | 11/1997 |
| JP | 2003-032220 | 1/2003 |
| JP | 2006-148220 | 6/2006 |

OTHER PUBLICATIONS

Chiba, K. et al., "Performance of Multitone Hopping CDMA Using Feedback-Controlled Hopping Pattern Over Multipath Channel," *Technical Report of IEICE*, vol. 107, No. 395, Dec. 11, 2007, pp. 1-6 (with English abstract).

Einarsson, G., "Address assignment for a time-frequency-coded, spread-spectrum system," *Bell System Technical Journal*, vol. 59, Sep. 1980, pp. 1241-1255 (summary).

Miyatake, T. et al., "Asynchronous, Decentralized DS-CDMA Using Feedback-Controlled Spreading Sequences for Time-Dispersive Channels," *IEICE Trans. Commun.*, vol. E91-B, No. 1, Jan. 2008, pp. 53-61.

(Continued)

*Primary Examiner* — Leon Flores
(74) *Attorney, Agent, or Firm* — Foley & Lardner LLP

(57) ABSTRACT

Communication performance is to be improved in a communication system in which a plurality of wireless communication lines share space. A transmitting device 2 transmits a transmission signal to a base station 6 a plurality of number of times. The base station 6 updates a weight $w_k$ to be used for an FIR filter, generates a hopping pattern $P_k$ to be used by the transmitting device 2 for generating a transmission signal, adjusts the hopping pattern $P_k$ so as to suppress a peak-to-average ratio (PAR) occurring in the transmission signal to generate a hopping pattern $P'_k$, quantizes the hopping pattern $P'_k$, and transmits the quantized hopping pattern $P'_k$ to the transmitting device 2. The transmitting device 2 uses the hopping pattern $P'_k$ received from the base station 6 in subsequent spread spectrum to generate a transmission signal.

19 Claims, 23 Drawing Sheets

OTHER PUBLICATIONS

Ulukus, S. et al., "Iterative Construction of Optimum Signature Sequence Sets in Synchronous CDMA Systems," *IEEE Trans. Inform. Theory*, vol. 47, No. 5, Jul. 2001, pp. 1989-1998.

Office Action for JP 2010-042252 mailed Apr. 7, 2010 (with English translation).

Notice of Reasons for Rejection for JP 2009-541653 mailed Jul. 5, 2010 (with English translation).

US Notice of Allowance on U.S. Appl. No. 12/665,322 DTD Jun. 29, 2011.

US Office Action for U.S. Appl. No. 12/665,322 dated Feb. 14, 2011.

US Notice of Allowance on U.S. Appl. No. 12/665,322 DTD Sep. 9, 2011.

* cited by examiner

COMMUNICATION SYSTEM 1

HARDWARE CONFIGURATION OF TX2 AND RX3 (BS4)

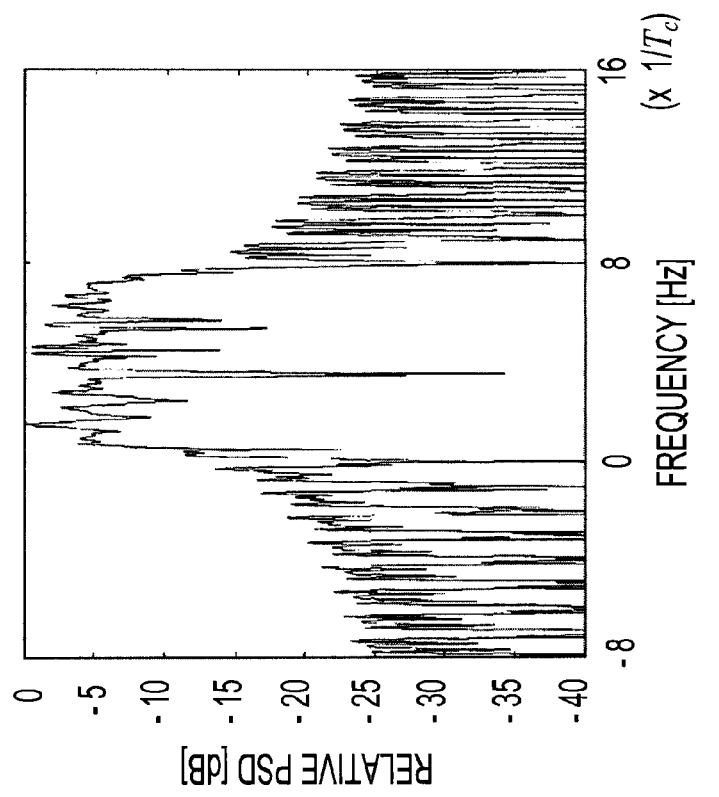
(b) POWER SPECTRA OF INITIAL HOPPING PATTERN
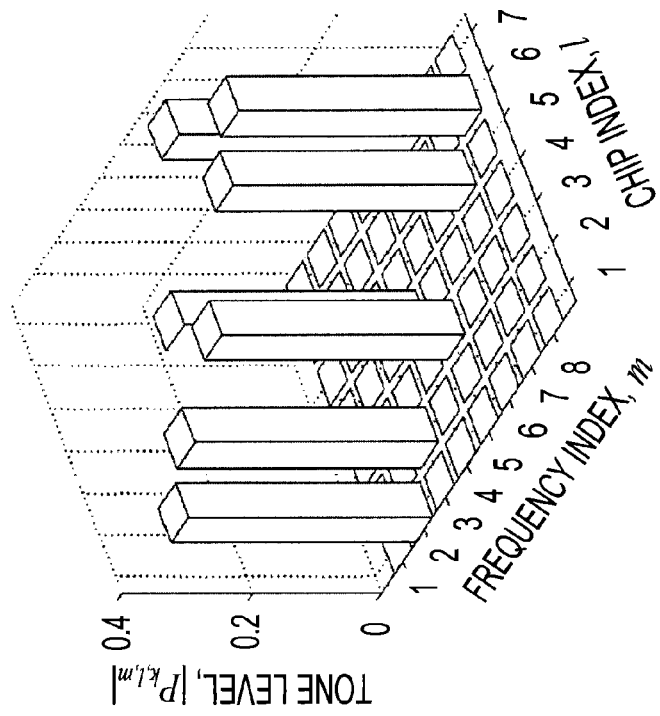
(a) INITIAL HOPPING PATTERN
FIG. 13B
FIG. 13A (d) POWER SPECTRA OF UPDATED HOPPING PATTERN (c) UPDATED HOPPING PATTERN PAR vs $\rho$ ($\beta = 0.3$ and $K = 32$)

(a) $\beta = 0.1$ AND $\rho = 0.9$ (b) $\beta = 0.3$ AND $\rho = 0.8$

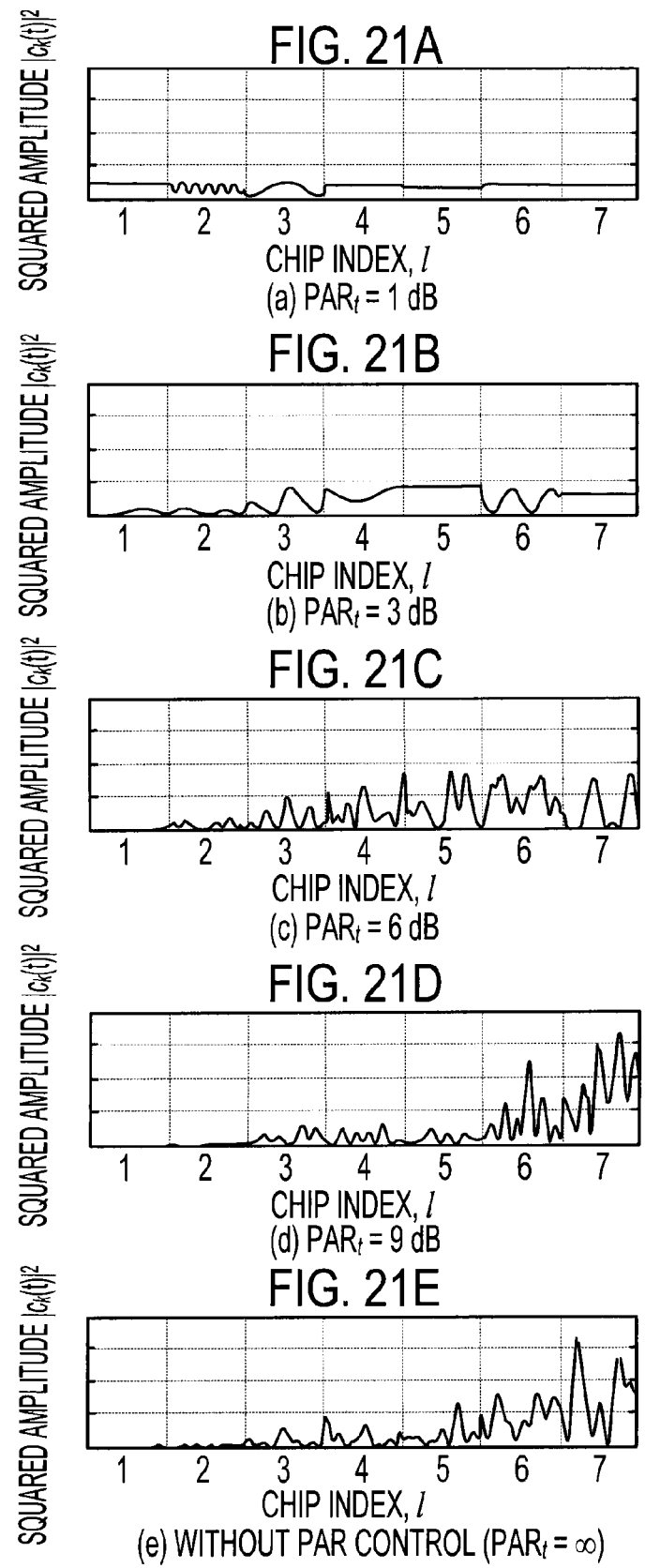

(a) BER (b) PAR

COMMUNICATION SYSTEM AND ITS METHOD

CROSS-REFERENCE TO RELATED APPLICATION

This application claims the benefit of Japanese Patent Application No. 2010-042252, filed Feb. 26, 2010, the entire contents of which are incorporated by reference herein and for all purposes as if fully set forth herein.

BACKGROUND OF THE INVENTION

1. Field of the Invention

The present invention relates to a communication system and its method for transmitting data in a spread spectrum system using frequency hopping.

2. Description of the Related Art

For example, Asynchronous Decentralized DS-CDMA Using Feedback-Control Spreading Sequences for Time-Dispersive Channels, (Kazuki CHIBA, Masanori HAMAMURA and Shin'ichi TACHIKAWA, IEICE TRANS COMMUN, VOL. E91-B, NO1. JANUARY 2008, PAPER, Special Section on Cognitive Radio and Spectrum Sharing Technology, The Institute of Electronics, Information and Communication Engineers) discloses a communication system configured such that any two communication devices are taken from a large number of communication devices to make a plurality of pairs of communication devices, each pair capable of transmitting data in an asynchronous DS-CDMA (Direct-Sequence Code Division Multiple Access) system.

Iterative Construction of Optimum Signature Sequence Sets in Synchronous CDMA systems, (S. Ulukus et. al., IEEE Trans. Inform., Theory, vol. 47, no. 5, pp. 1989-1998, July 2001) discloses a communication system where a receiving device feeds back a hopping pattern to a transmitting device.

Address Assignment for a Time-Frequency-Coded Spread-Spectrum System (G. Einarson, Bell Syst. Tech. J., vol. 59, no. 7, pp. 1241-1255, September 1980) discloses an initial value of a hopping pattern P.

Multitone-Hopping CDMA Using Feedback-Controlled Hopping Pattern for Decentralized Multiple Access (IEICE Trans. Fundamentals, vol. E91, No. 12, December 2008) discloses a method in which a transmitting device adjusts parameters for generating transmission signals based on information fed back to the transmitting device from a receiving device for the purpose of improving reception quality of transmission signals at the receiving device.

SUMMARY OF THE INVENTION

The communication system and its method according to the present application has been made against the above background, and one of the embodiments thereof is a communication system including a plurality of transmitting devices and one or more receiving devices, wherein in a pair formed by one or more of the transmitting devices and one or more of the receiving devices: the transmitting device comprises a signal transmission unit for sequentially spreading, based on a spread pattern including a plurality of first elements defined with respect to components of a predetermined first number of first domains and components of a predetermined second number of second domains and arranged so as to spread transmission data to the components of the first domains and the components of the second domains, the transmission data to the components of the first domains and the components of the second domains at each predetermined time interval and transmitting the transmission data as a transmission signal, and an updating unit for updating, based on the spread pattern received from the receiving device, the spread pattern used to spread the transmission data; and the receiving device comprises a receiving unit for receiving the transmission signal, an expansion unit for sequentially expanding the received transmission signal into a plurality of second elements defined with respect to components of the first domains whose number is equal to or greater than the first number and components of the second domains whose number is a fourth number that is greater than the second number at each of the time intervals, a processing unit for sequentially performing a process using a plurality of first coefficients defined for each of the second elements on the second elements obtained as a result of the expansion at each of the time intervals, a generation unit for generating new first coefficients using the processed second elements and the first coefficient, selection means for selecting a second coefficient corresponding to the spread pattern from among the new first coefficients, a pattern generation unit for adjusting the selected second coefficient to generate a new spread pattern, and a pattern transmission unit for transmitting the new spread pattern to the transmitting device.

SUMMARY

An embodiment of the communication system according to the present invention includes, for example, a plurality of communication devices (transmitting devices) which access one or more base stations (receiving devices), and a transmission signal obtained by spreading transmission data based on a hopping pattern represented in a matrix form is transmitted simultaneously and in parallel between each of the base stations and each of the plurality of communication devices.

As described above, a transmission signal is transmitted simultaneously and in parallel between base stations and communication devices and the same wireless communication path is shared. Thus, a transmission signal between a given base station and a communication device is superimposed on a wireless communication path between another base station and the communication device, thereby decreasing the transmission quality of the transmission signal between the base station and the communication device.

A base station (receiving device) receives a transmission signal from a communication device (transmitting device), expands the received transmission signal into a matrix of components of a frequency domain and components of a time domain, multiplies each of the expanded matrix elements by a coefficient (first coefficient) for filtering, adds the multiplication results in a row direction and in a column direction, and then outputs the sums as the filtering results.

The first coefficient can be expressed in a matrix form that uses the first coefficient as an element and whichever is larger in the row direction and in the column direction or in any one of the row and column directions than the matrix of the frequency hopping pattern.

The base station (receiving device) uses the above filtering results to update the matrix of the first coefficients so as to improve the quality of transmission data decoded from the transmission signal.

Further, the base station (receiving device) extracts second coefficients corresponding to a hopping pattern from the updated matrix of the first coefficients.

The second coefficients are transmitted to the communication device (transmitting device) to be used as a new hopping pattern (spread pattern), and gradually improves the transmission quality between the base station (receiving device) and the communication device (transmitting device).

A ratio of an average value to a peak value (PAR; Peak-to-Average Ratio) of the power of a transmission signal generated when the second coefficients are used at the communication device (transmitting device) can be calculated from the second coefficients.

An increase in the PAR value signifies an increase in power consumption by the communication device (transmitting device) as well as a decrease in the transmission quality between the base station (receiving device) and the communication device (transmitting device).

In order to prevent such problems, the base station (receiving device) adjusts elements included in the second coefficients so as to hold the PAR value to or below a certain value to set a new hopping pattern, and transmits the new hopping pattern to the communication device (transmitting device).

The communication device (transmitting device) receives the new hopping pattern from the base station (receiving device). By using the new hopping pattern when subsequently generating transmission signals, the communication device (transmitting device) holds the PAR value to or below a certain value, and further achieves a reduction in power consumption and an improvement in communication quality.

The technical advantages of the present invention and other technical advantages should be readily apparent to those skilled in the art by reading the detailed description of the embodiments illustrated in the accompanying drawings.

The accompanying drawings are incorporated in the present specification so as to constitute a part thereof, to illustrate embodiments of the present invention, and to serve to explain the embodiments as well as the principle of the present invention.

The drawings referred to in the present specification should not be understood to be drawn in a certain scale unless otherwise noted.

BRIEF DESCRIPTION OF THE DRAWINGS

The embodiments of the present invention should be most readily understood by referring to the following description as well as the accompanying drawings regarding the configuration and the operation thereof.

FIG. 9 is a communication sequence diagram illustrating data transmission and feedback (S10) of a hopping pattern $P_k$ between the transmitting device and the receiving device illustrated in FIG. 1 and the like;

FIGS. 13A to 13D are a diagram illustrating, in graph form, an initial hopping pattern, an updated hopping pattern, and corresponding power spectra;

FIGS. 21A to 21E illustrate amplitudes of a signature wave $c_k(t)$ when a target value $PAR_1$ is varied from 1 dB to infinity (without PAR control);

FIG. 22 illustrates characteristics obtained when applying a second FC/MH-CDMA system to the communication systems illustrated in FIGS. 1 and 14, wherein

DETAILED DESCRIPTION OF THE PREFERRED EMBODIMENTS

Hereinafter, embodiments of the present invention will be described in detail.

The embodiments of the present invention are illustrated in the accompanying drawings.

Although the present invention is described in connection with the embodiments, it should be understood by those skilled in the art that the description herein of specific embodiments is not intended to limit the present invention to the particular forms disclosed.

On the contrary, the present invention is intended to cover the explicit spirit of the present invention as defined by the appended claims as well as all alternatives, modifications, and equivalents falling within the scope of the present invention as defined by the appended claims.

Moreover, the present invention is described specifically as well as in detail to the level that those skilled in the art can sufficiently understand the appended claims.

However, as will be apparent to those skilled in the art, the present invention may be made without following all the descriptions described specifically as well as in detail herein.

It should be noted that known methods, procedures, components, and circuits may not be described in detail for a simplified description of the embodiments of the present invention.

However, it should be noted that these terms and other similar terms should each be associated with an appropriate physical quantity and thus should be understood as a convenient label assigned to the corresponding quantity.

As will be apparent from the above discussion that unless otherwise noted, throughout the present invention, the description containing the terms such as "spread" and "transmit" should be understood to mean an operation and a process executed by a specific use of a computer hardware resource or a dedicated hardware resource.

First Embodiment

First, a first embodiment of the present application will be described.

Figure 1:
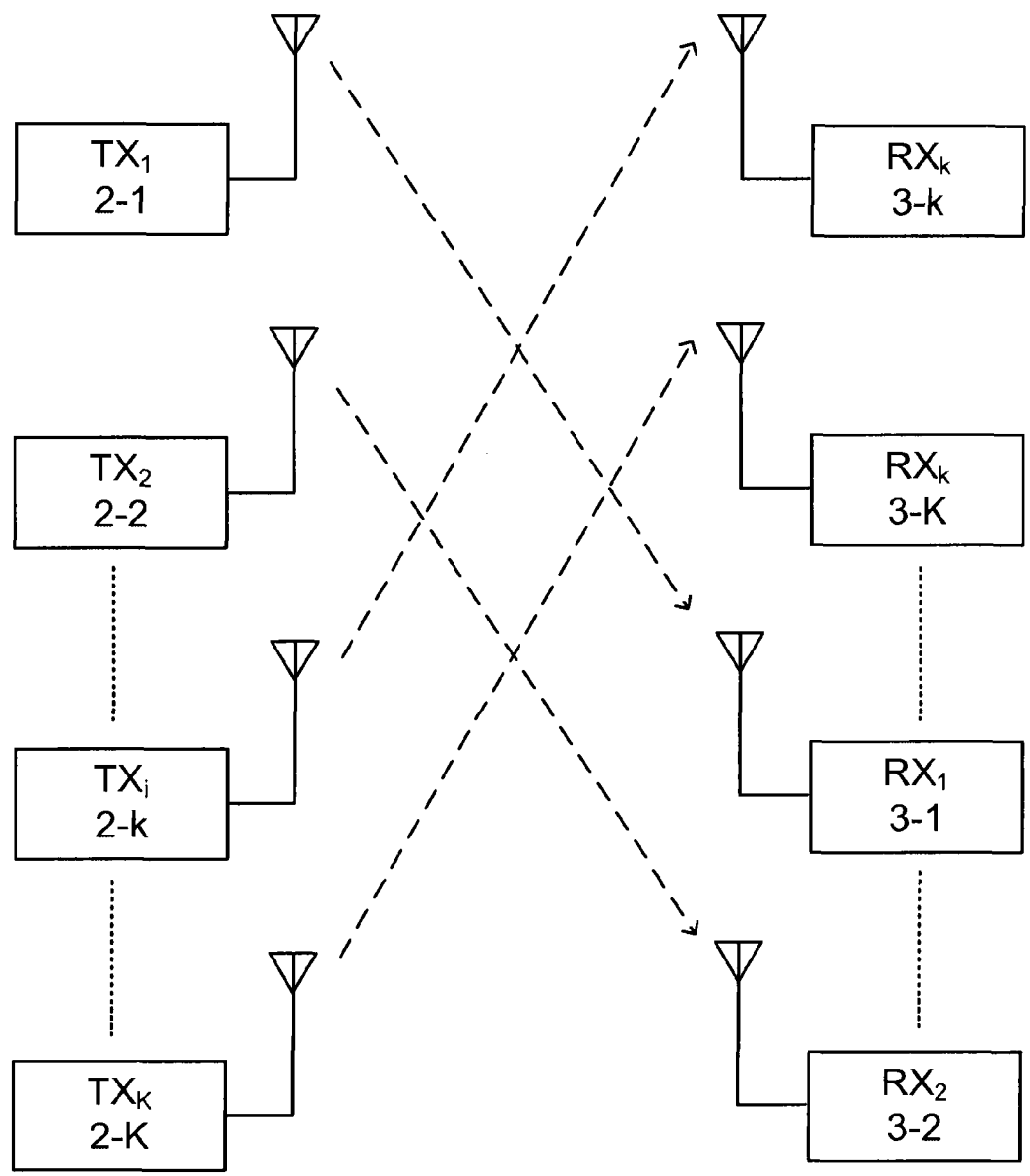
FIG. 1 illustrates a first communication system according to a first embodiment of the present application.

FIG. 1 illustrates a first communication system 1 according to the first embodiment of the present application.

As illustrated in FIG. 1, the communication system 1 includes K (where K is an integer satisfying K≧2) number of transmitting devices (TX) 2-1 to 2-K and K number of receiving devices (RX) 3-1 to 3-K, each of which is fixed or semi-fixed in one place or mobile.

In the following description, when any one of the plurality of components such as transmitting devices 2-1 to 2-K is specified without identifying a specific transmitting device, the transmitting device may be written simply as the transmitting device 2 for simplicity.

Hereinafter, the same reference numeral or reference character denotes substantially the same component or process throughout the figures.

Note that the transmitting device 2 and the receiving device 3 may be of the same configuration, but are distinguished from each other in the following description for the purpose of substantiating and clarifying the description.

As described above, the communication system 1 is configured such that one transmitting device 2 may transmit a transmission signal to a plurality of receiving devices 3, a plurality of transmitting devices 2 may each transmit a transmission signal to one receiving device 3, and a plurality of transmitting devices 2 may each transmit a transmission signal to a plurality of receiving devices 3.

However, in the following description, for the purpose of substantiating and clarifying the description, the communication system 1 is configured as a specific example such that: one transmitting device 2-$k$ (K≧k≧1) and one receiving device 3-$k$ are paired; a transmission signal is transmitted only between the transmitting device 2-$k$ and the receiving device 3-$k$ included in each of the plurality of pairs; and based on a frequency hopping pattern, spread spectrum is performed on the transmission signal $s_k(t)$ expressed by a low-pass equivalent.

Figure 2:
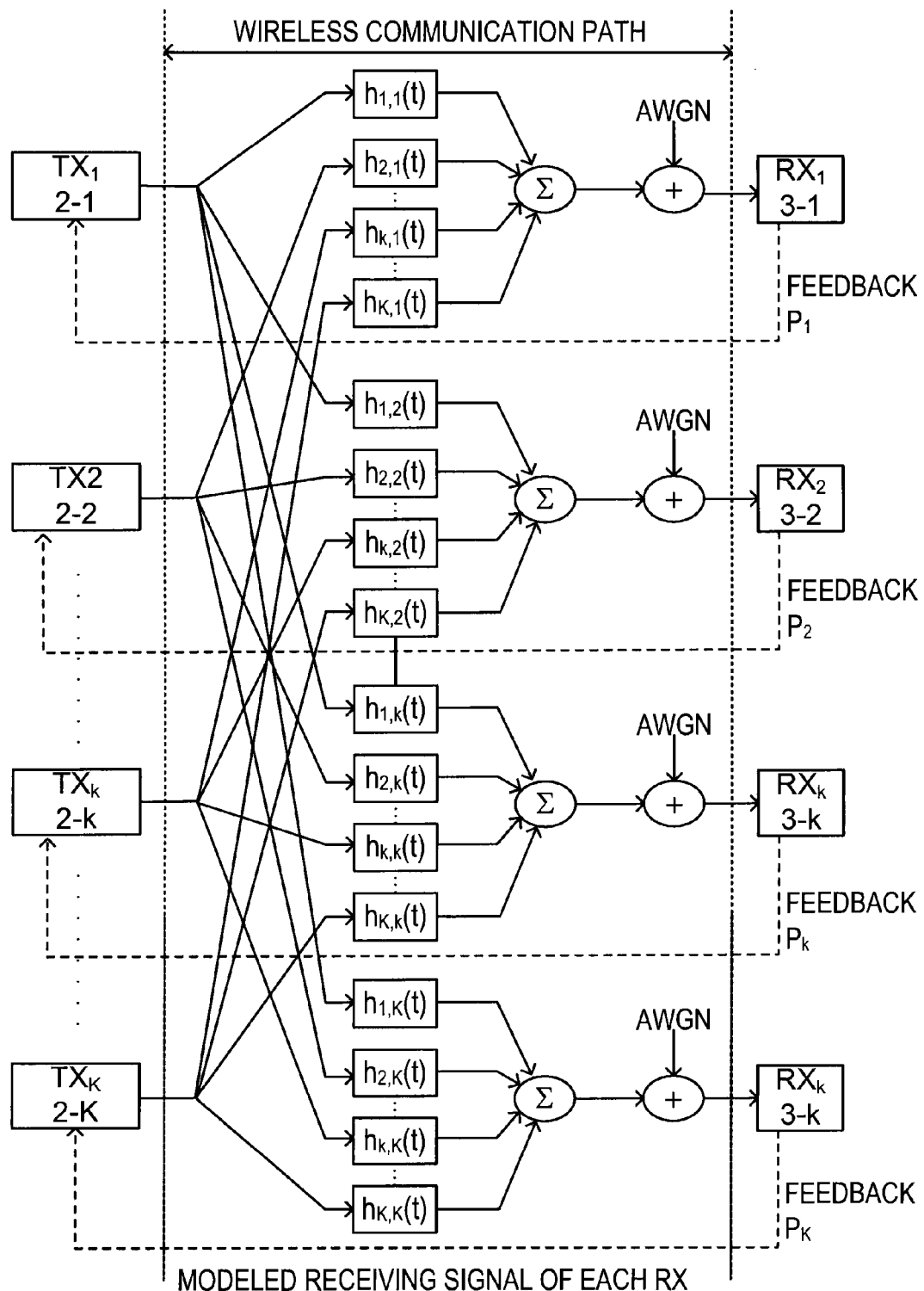
FIG. 2 illustrates modeled transmission signals $s'_k(t)$ received by a receiving device of the communication system illustrated in FIG. 1 and feedback of a hopping pattern from the receiving device to a transmitting device.

FIG. 2 illustrates modeled transmission signals $s'_k(t)$ received by the receiving device 3-$k$ of the communication system 1 illustrated in FIG. 1 and a hopping pattern fed back from the receiving device 3-$k$ to the transmitting device 2-$k$.

The communication system 1 allows a wireless transmission path to be shared by not only a pair of the transmitting device 2-$k$ and the receiving device 3-$k$ but also other pairs.

In this case, as illustrated in FIG. 2, the receiving device 3-$k$ receives not only the transmission signal $s_k(t)$ from the transmitting device 2-$k$ included in the same pair but also transmission signals $s'_k(t)$ including transmission signals from the transmitting devices 2-1 to 2-($k$−1) and 2-($k$+1) to 2-K included in other pairs. In other words, the communication system 1 allows the receiving device 3-$k$ to be constantly susceptible to interference from each of the transmitting devices 2-$k'$ belonging to other pairs.

Even in such circumstances, the receiving device 3-$k$ of the communication system 1 sequentially updates a weight matrix ($W_k$) expressed in complex weights $w_{k,\,m,\,l}$ (M≧m≧1 and L+α≧l≧1, where α is an integer satisfying α≧0 and l is a process for each chip time length $T_c$) and used for filtering so as to improve receiving performance of the transmission signal $s_k(t)$ received from the transmitting device 2-$k$ belonging the same pair.

Further, the receiving device 3-$k$ feeds back a part of the elements of the updated weight matrix ($W_k$) to the transmitting device 2-$k$ as a hopping pattern $P_k$ and causes the transmitting device 2-$k$ to update the hopping pattern used for spectrum spreading so that the transmission signal $s_k(t)$ itself can be subject to spectrum spreading using a pattern suitable for passing through the wireless transmission path illustrated in FIG. 2.

Hereinafter, a system that communicates using a CDMA system by feeding back a hopping pattern from the receiving device 3 to the transmitting device 2 and optimizing the hopping pattern will also be referred to as an FC/MC-CDMA (Feedback Controlled multitone-hopping Code-Division Multiple Access) system.

[Hardware Configuration]

Figure 3:
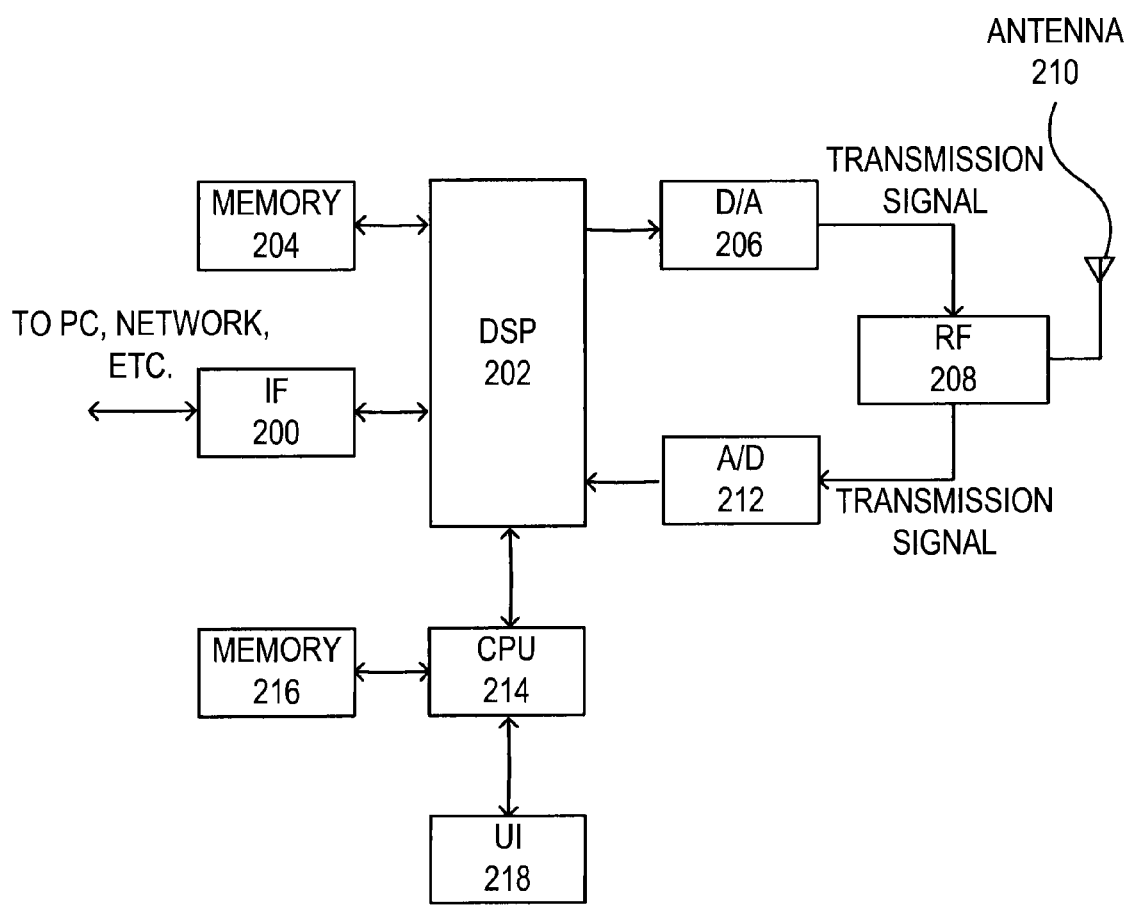
FIG. 3 illustrates a hardware configuration of the transmitting device and the receiving device illustrated in FIG. 1.

FIG. 3 illustrates a hardware configuration of the transmitting device 2 and the receiving device 3 illustrated in FIG. 1.

As illustrated in FIG. 3, the transmitting device 2 and the receiving device 3 are used connected to a computer (PC) or a network (not illustrated) such as a LAN where a message symbol (transmission data) $b_k(n)$ (where n denotes the sequence of message symbols) in a QPSK (quadrature phase-shift keying) system is outputted to the transmitting device 2 or the message symbol $b_k(n)$ is inputted from the receiving device 3.

The transmitting device 2 and the receiving device 3 include an interface (IF) circuit 200, a digital signal processor (DSP) 202, a memory 204 for the DSP 202, a digital/analog (D/A) converter 206, a radio frequency (RF) circuit 208, an antenna 210, an analog/digital (A/D) converter 212, a CPU 214, a memory 216 for the CPU 214, and a user interface (UI)

device 218 for interfacing between the transmitting device 2 or the receiving device 3 and the user.

The transmitting device 2 and the receiving device 3 include a component such as a cell phone configured to be able to transmit voice and data in the CDMA system or a radio LAN device serving as a computer allowing software to perform signal processing, radio communication and information processing.

Note that in the following description, for the purpose of substantiating and clarifying the description, it is assumed as a specify example that the transmitting device 2 and the receiving device 3 allow software to perform signal processing and information processing.

However, the transmitting device 2 and the receiving device 3 may be configured to allow embedded hardware to perform signal processing and information processing depending on the configuration, application, and performance requirement thereof.

Moreover, the transmitting device 2 and the receiving device 3 do not necessarily use both the DSP 202 and the CPU 214, but may use either any one depending on the configuration, application, and performance requirement thereof.

In the transmitting device 2-$k$ and the receiving device 3-$k$, the IF 200 provides a function to input and output the message symbol $b_k(n)$ between the computer or the network and the transmitting device 2 and the receiving device 3.

The DSP 202 executes a signal processing program stored in the memory 204 to perform spread spectrum on a message symbol $b_k(n)$ inputted from the IF 200 or a message symbol $b_k(n)$ generated from a voice inputted through a microphone (not illustrated) of the UI 218, and outputs the message symbol $b_k(n)$ subjected to spread spectrum to the D/A 206.

The D/A 206 converts the digital message symbol $b_k(n)$ subjected to spread spectrum to a transmission signal $s_k(t)$ with an analog baseband or an intermediate frequency that is a frequency processable by the DSP 202 or the CPU 214, and outputs the transmission signal $s_k(t)$ to the RF 208.

The RF 208 converts the transmission signal $s_k(t)$ to a transmission signal $s_k(t)$ of a frequency used for signal transmission between the transmitting device 2 and the receiving device 3 and transmits the signal to the wireless transmission path through the antenna 210.

In addition, the RF 208 receives the transmission signal $s_k(t)$ from the transmitting device 2 or the receiving device 3 that is the communication party, converts the signal to a transmission signal $s_k(t)$ of a baseband or an intermediate frequency, and outputs the signal to the A/D 212.

The A/D 212 converts the analog transmission signal $s_k(t)$ to a digital transmission signal $s_k(t)$ and outputs the signal to the DSP 202.

The CPU 214 executes a program stored in the memory 216 to control the operation of the transmitting device 2 and the receiving device 3, for example, according to a user operation made on the UI 218.

In addition, the CPU 214 performs processes of setting and updating a weight used for filtering the transmission signal $s_k(t)$ received by the DSP 202.

Moreover, the CPU 214 controls the UI 218 so as to present the user with information and the like.

[Software Configuration]

Figure 4:
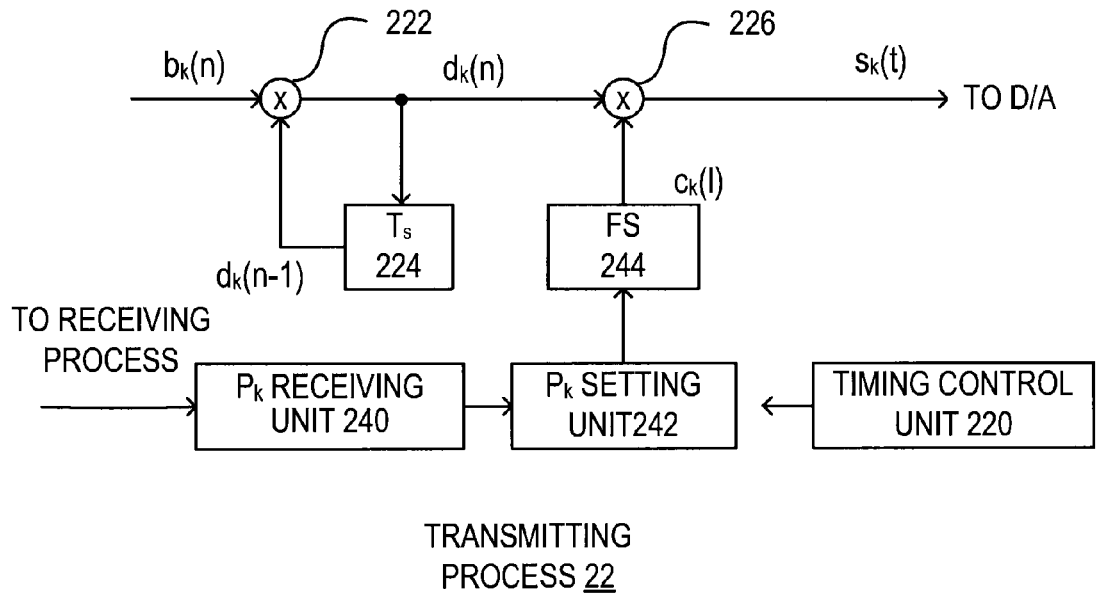
FIG. 4 illustrates a configuration of a first transmitting program executed by the transmitting device and the receiving device illustrated in FIG. 1.

FIG. 4 illustrates a configuration of a first transmitting program 22 executed by the transmitting device 2-$k$ and the receiving device 3-$k$ illustrated in FIG. 1.

Figure 5:
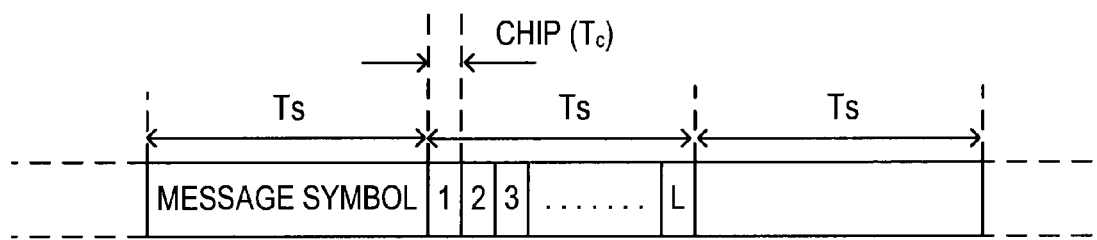
FIG. 5 illustrates a configuration of a symbol and a chip used by the transmitting device and the receiving device.

FIG. 5 illustrates a configuration of a symbol and a chip used by the transmitting device 2 and the receiving device 3.

As illustrated in FIG. 4, the first transmitting program 22 includes a timing control unit 220, first and second multiplication units 222 and 226, a delay unit 224, a first hopping pattern ($P_k$) receiving unit 240, a first hopping pattern setting unit 242 and a frequency synthesizer (FS) unit 244.

The first transmitting program 22 is supplied to the transmitting device 2 and the receiving device 3 via, for example, a storage medium or the network; is loaded onto the DSP memory 204 or loaded onto the CPU memory 216 illustrated in FIG. 3; and is executed by specifically using a hardware resource of the transmitting device 2 and the receiving device 3 under an OS such as ITRON to be executed by the DSP 202 or the CPU 214 (the same is applied to the each of the following programs).

The transmitting program 22 uses the above components to perform spread spectrum on a message symbol $b_k(n)$ inputted through the network or the like according to a hopping pattern to generate a transmission signal $s_k(t)$ and outputs the signal to the D/A 206.

In the transmitting program 22 executed by the transmitting device 2-$k$, the timing control unit 220 controls the timing of the operation of each component of the transmitting program 22 so that processes are performed in synchronization with the message symbol $b_k(n)$ and the chip illustrated in FIG. 5.

The delay unit 224 gives a delay $T_s$ of one message symbol to a multiplication result $d_k(n-1)$ of an $(n-1)$th message symbol $b_k(n-1)$ outputted from the first multiplication unit 222.

When an nth message symbol $b_k(n)$ is inputted to the first multiplication unit 222, the delay unit 224 outputs the delayed multiplication result to the first multiplication unit 222 as delay data $d_k(n-1)$.

The first multiplication unit 222 multiplies the inputted nth message symbol $b_k(n)$ by the delay data $d_k(n-1)$ inputted from the delay unit 224 and outputs the multiplication result $d_k(n)$ to the delay unit 224 and the second multiplication unit 226.

Note that as discussed later as a performance evaluation of the communication system 1, the weight adjustment (training) of the filter unit 4 is performed using known data (pilot) stored in advance in the transmitting device 2 and the filter unit 4, the above described process (differential encoding) by the delay unit 224 and the first multiplication unit 222 is not required.

In this case, the transmitting device 2 outputs the message symbol $b_k(n)$ itself to the multiplication unit 226 as the multiplication result $d_k(n)$.

The first hopping pattern receiving unit 240 receives a hopping pattern $P_k$ used for spread spectrum of the message symbol $b_k(n)$ by frequency hopping (FH) from the receiving device 3 via the antenna 210, the RF 208, the A/D 212, and a first receiving program 30 (described later with reference to FIGS. 6 to 8) executed by the transmitting device 2-$k$, and outputs the hopping pattern $P_k$ to the hopping pattern receiving unit 240.

The hopping pattern $P_k$ can be expressed as an M×L matrix as given in the following expression 1, where a column component includes the number of components corresponding to a code length L (L number of components of a time domain, where L denotes an integer satisfying $L \geq 2$) per chip and a row component includes M number (where M denotes an integer satisfying $M \geq 2$) of components of a frequency domain contained in a signature wave signal $c_k(t)$ generated by the frequency synthesizer unit 244.

[Expression 1]

$$P_k = \begin{bmatrix} p_{k,1,1} & p_{k,1,2} & \cdots & p_{k,1,M} \\ p_{k,2,1} & p_{k,2,2} & \cdots & p_{k,2,M} \\ \vdots & \vdots & \ddots & \vdots \\ p_{k,L,1} & p_{k,L,2} & \cdots & p_{k,L,M} \end{bmatrix} \quad (1)$$

The first hopping pattern setting unit 242 replaces an old hopping pattern $P_k$ which has been used so far with a new hopping pattern $P_k$ inputted from the hopping pattern receiving unit 240 to update the hopping pattern.

In addition, the hopping pattern setting unit 242 outputs the updated hopping pattern $P_k$ to the frequency synthesizer unit 244.

The frequency synthesizer unit 244 generates a signature wave signal $c_k(t)$ of a frequency based on the hopping pattern $P_k$ inputted from the hopping pattern setting unit 242 and outputs the signal to the second multiplication unit 226.

The second multiplication unit 226 operates as a quadrature modulator, performs complex multiplication on the multiplication result $b_k(n)$ inputted from the first multiplication unit 222 and on the signature wave signal $c_k(t)$ for spreading spectrum, and outputs the multiplication result to the D/A 206 (FIG. 3) as digital data indicating the transmission signal $s_k(t)$.

The D/A 206 converts the digital data indicating the transmission signal $s_k(t)$ to an analog transmission signal $s_k(t)$, which is converted to a frequency used for transmission between the transmitting device 2 and the receiving device 3 by the RF 208. Then, the frequency undergoes power amplification before the signal is transmitted to each communication party via the antenna 210.

Figure 6:
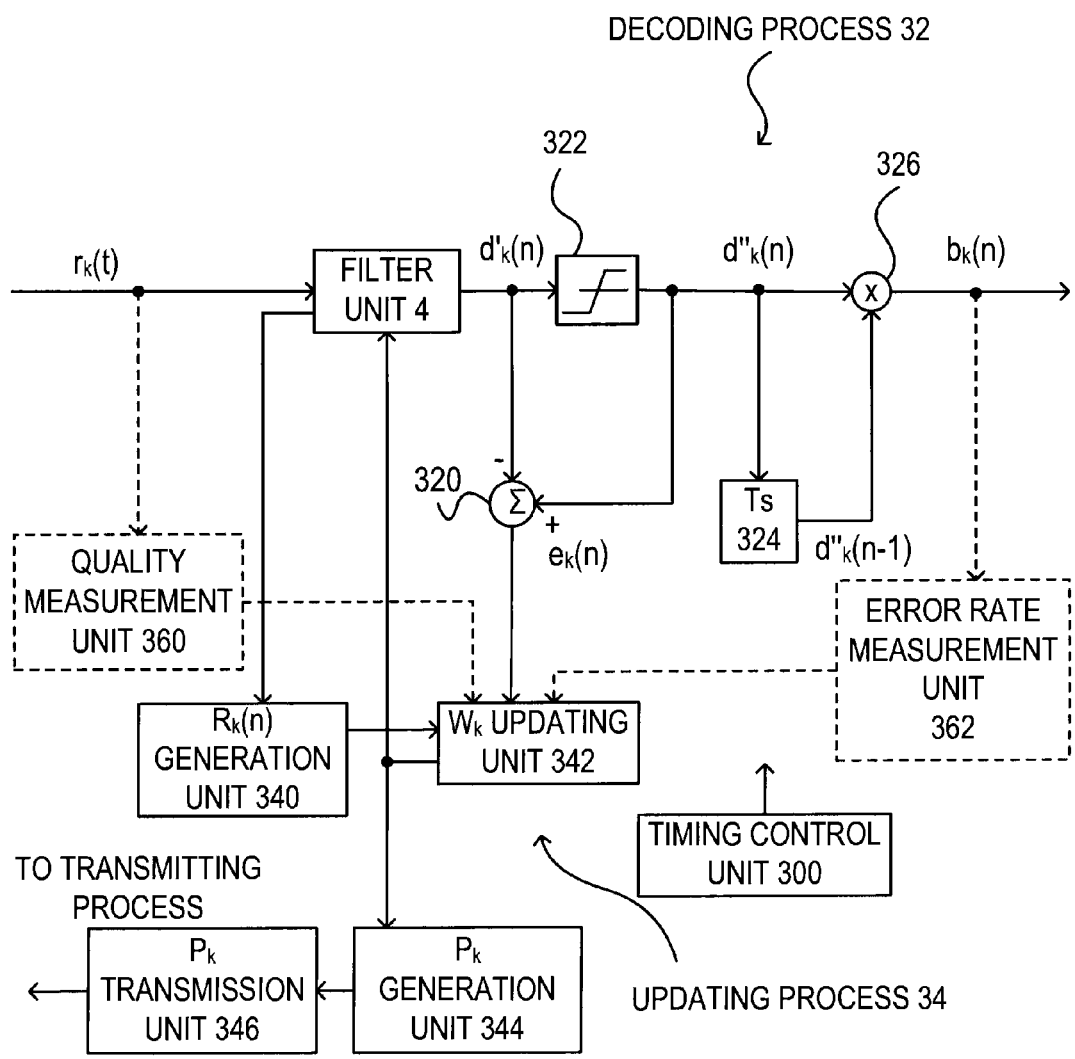
FIG. 6 illustrates a configuration of a first receiving program executed by the transmitting device and the receiving device illustrated in FIG. 1.

FIG. 6 illustrates a configuration of a first receiving program 30 executed by the transmitting device 2-$k$ and the receiving device 3-$k$ illustrated in FIG. 1.

Figure 7:
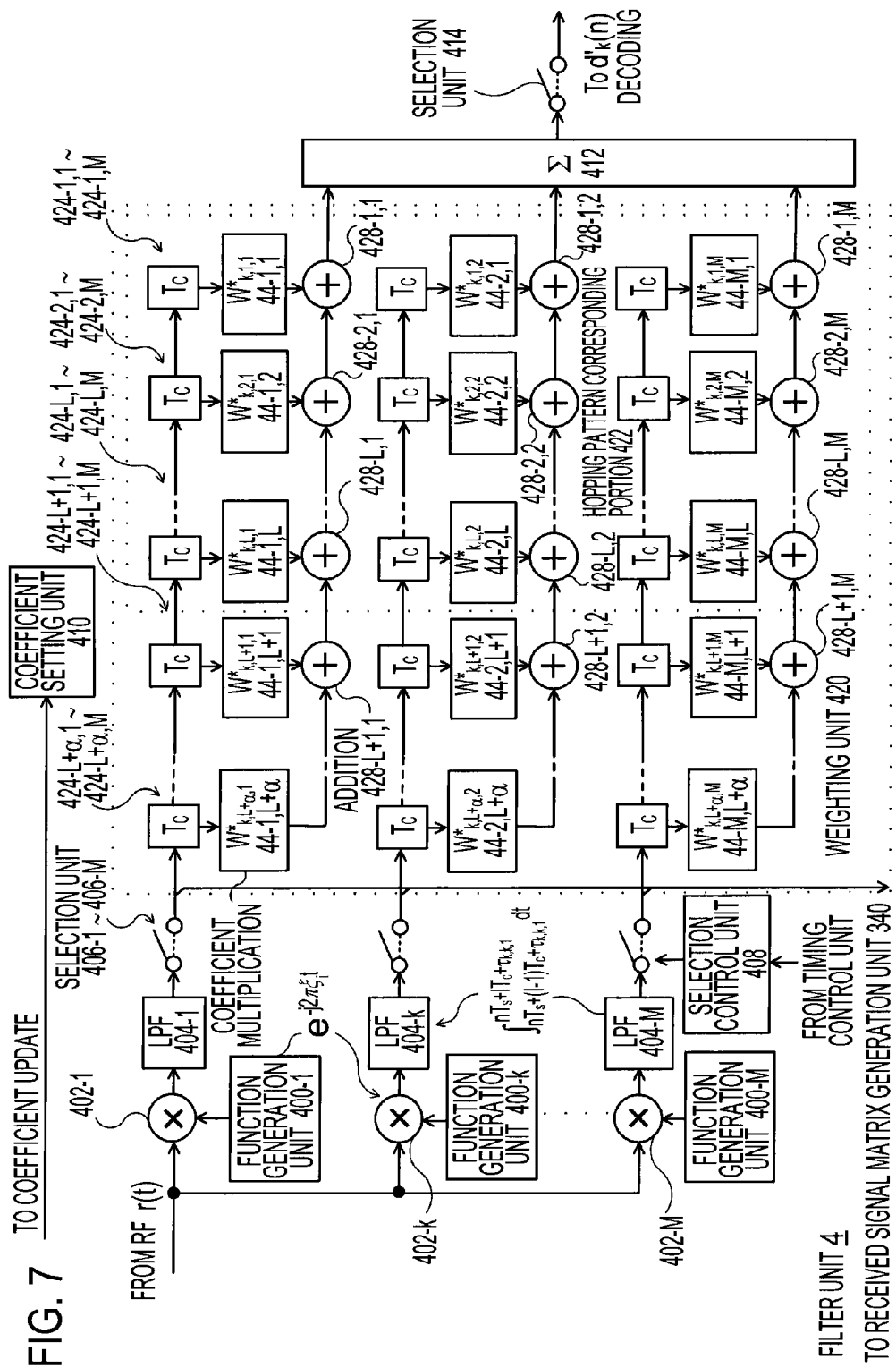
FIG. 7 illustrates a configuration of a filter unit of the receiving program illustrated in FIG. 6.

FIG. 7 illustrates a configuration of a filter unit 4 of the receiving program 30 illustrated in FIG. 6.

Figure 8:
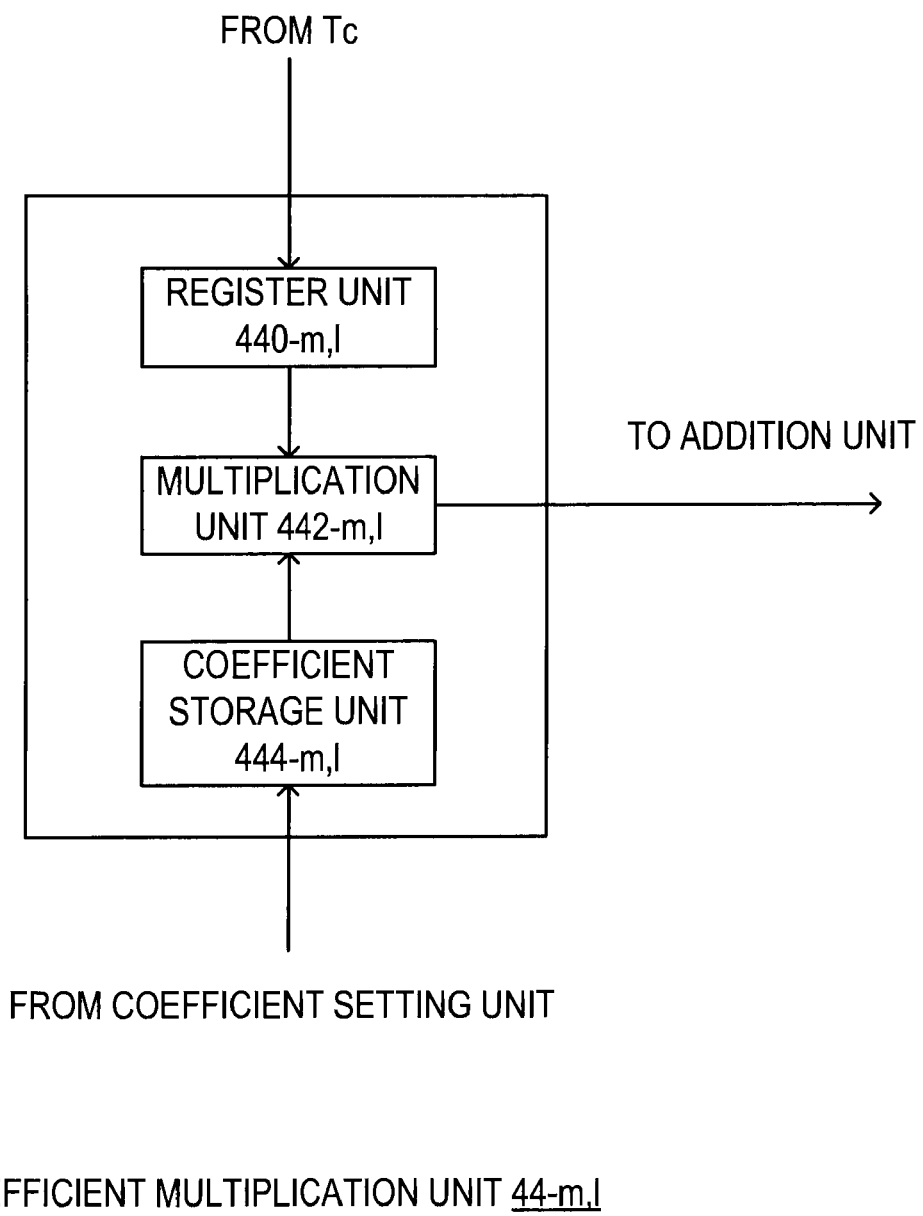
FIG. 8 illustrates a configuration of a coefficient multiplication unit illustrated in FIG. 7.

FIG. 8 illustrates a configuration of a coefficient multiplication unit 44 illustrated in FIG. 7.

As illustrated in FIG. 6, the first receiving program 30 includes a timing control unit 300, a filter unit 4, a decoding unit 32, and an updating unit 34.

The decoding unit 32 includes an addition unit (Σ) 320, a demodulation unit 322, a delay unit 324, and a multiplication unit 326.

The updating unit 34 includes a received signal matrix ($R_k(n)$) generation unit 340, a weight ($w_k$) updating unit 342, a first hopping pattern ($P_k$) generation unit 344, and a first hopping pattern transmission unit 346.

As illustrated in FIG. 7, the filter unit 4 illustrated in FIG. 7 includes M number of function generation units 400-1 to 400-M each corresponding to a component of the frequency domain of the hopping pattern $P_k$, multiplication units 402-1 to 402-M, low pass filter (LPF) units 404-1 to 404-M, selection units 406-1 to 406-M and 414, a selection control unit 408, a coefficient setting unit 410, a weighting unit 420 including a hopping pattern corresponding portion 422 containing M×L number of elements each corresponding to a hopping pattern $P_k$, and a total sum calculation unit (Σ) 412, which constitute an FIR filter.

Note that in the following description, for the purpose of clarifying the description, the reference numeral or reference character may be followed by ( ) such as (1, 1). Therefore, reference numerals or reference characters may differ between the following description and the corresponding drawings.

The weighting unit 420 includes M×(L+α) number of delay units 424-(1, 1) to 424-(M, L) and 424-(1, L+1) to 424-(M, L+α), M×(L+α) number of coefficient multiplication units 44-(1, 1) to 44-(M, L) and 44-(1, L+1) to 44-(M, L+α), and M×(L+α−1) number of addition units 428-(1, 1) to 428-(M, L) to 428-(1, L+1) to 428-(M, L+α−1).

Among the components of the above weighting unit 420, the hopping pattern corresponding portion 422 corresponds to each of the M×L number of delay units 424-(1, 1) to 424-(M, L), coefficient multiplication units 426-(1, 1) to 426-(M, L), and addition units 428-(1, 1) to 428-(M, L).

It should be noted that apparently the technical scope of the present invention also covers the communication system 1 including a modified receiving program 30 which further increases each component of the weighting unit 420 such that the M×(L+α) number of delay units 424, coefficient multiplication units 44 or the M×(L+α−1) number of addition units are increased to (M+1)×(L+α) number of units or (M+1)×(L+α−1) number of units, or further increases the number of each component of the weighting unit 420.

As illustrated in FIG. 8, the coefficient multiplication unit 44-$m$, 1 illustrated in FIG. 7 includes a register unit 440-$m$, 1, a multiplication unit 442-$m$, 1, and a coefficient storage unit 444-$m$, 1.

Note that the delay units 424-$m$, 1 to (m, L+α) and the register units 440-$m$, 1 to (m, L+α) illustrated in FIG. 7 serve as L+α stages of shift registers which shift complex data received from a previous stage to a subsequent stage every $T_c$.

The receiving program 30 executed by the receiving device 3-$k$ uses the above components to receive a transmission signal transmitted from the transmitting devices 2-1 to 2-K via the antenna 210, the RF 208, and the A/D 212 (FIG. 3), decodes a message symbol $b'_k(n)$ from the digitally converted transmission signal $s'_k(t)$, and outputs the message symbol to the network or the like.

In addition, the receiving program 30 repeatedly updates the weight matrix ($W_k$) expressed in an M×(L+α) matrix used by the filter unit 4 a predetermined number of times so as to decode the message symbol $b'_k(n)$ corresponding to the message symbol $b_k(n)$ in the transmitting device 2-$k$ belonging to the same pair with excellent performance from the transmission signal $s'_k(t)$ received from the transmitting devices 2-1 to 2-K.

Among the updated weight matrices $W_k$, the receiving program 30 transmits (feeds back) an element corresponding to the hopping pattern corresponding portion 422 to the transmitting device 2-$k$ via the D/A 206, the RF 208 and the antenna 210 as illustrated in FIG. 2 so as to update the hopping pattern $P_k$.

That is, the hopping pattern $P_k$ is defined as complex conjugates $w_{k, m, l}$ of numerical values $w^*_{k, m, l}$ multiplied by (first to Mth row)×(first to Lth column) number of components starting with the component first inputted to the filter unit 4 among the weight matrices $W_k$ (* preceded by a symbol denotes a complex conjugate of a numerical value indicated by the symbol).

It should be noted that the technical scope of the present invention also covers the communication system 1 including a modified receiving program 30 which associates the hopping pattern $P_k$ with a component of a weight matrix $W_k$ different from the above in a time axis direction.

As illustrated in FIGS. 6 to 8, in the receiving program 30 executed by the receiving device 3-$k$, the timing control unit 300 controls the timing of an operation of each component of the receiving program 30 so that processes are performed in synchronization with the message symbol $b_k(n)$ and the chip illustrated in FIG. 5.

The selection control unit 408 controls the timing of the selection of each of the selection units 406 and 414.

A digital message symbol r(t) is inputted to the multiplication units 402-1 to 402-M of the filter unit 4 of the receiving program 30.

Each function generation unit 400-m generates a function $e^{-j2\pi \xi mt}$, and outputs the function to the multiplication unit 402-m.

Note that in the function $e^{-j2\pi \xi mt}$, j is $(-1)^{1/2}$, and $\xi_m$(Hz) denotes a frequency of an mth tone of the spectrum-spread transmission signal such as $\xi_m = (m-1)/T_c$(Hz).

Each multiplication unit 402-m operates as a quadrature modulator and performs complex multiplication on the transmission signal r(t) inputted from the A/D 212 (FIG. 3) and the function $e^{-j2\pi \xi mt}$ inputted from the function generation unit 400-m to output a complex multiplication result $r(t)e^{-j2\pi \xi mt}$ to the LPF 404-m.

Each LPF 404-m is implemented, for example, by an integrator which integrates the multiplication result $r(t) e^{-j2\pi \xi mt}$ inputted from the multiplication unit 402-i from a time $nT_s + (l-1)T_c + \tau_{k, k, 1}$ to a time $nT_s + lT_c + \tau_{k, k, 1}$.

In this case, each LPF 404-m passes a frequency component $r_{k, m, l}(n)$ of an mth tone of an lth chip for the purpose of decoding an nth message symbol $b_k(n)$ and outputs the frequency component to the selection unit 406-m.

At a timing $(t = T_s + lT_c + \tau_{k, k, 1})$ when each LPF unit 404-m completes integration, the selection unit 406-m, according to the control of the selection control unit 408, selects the frequency component $r_{k, m, l}(n)$ inputted from the LPF 404-m and outputs the frequency component to the delay unit 424-m, 1 and the received signal matrix generation unit 340.

When a frequency component $r_{k, m, L+\alpha}(n)$ of an mth tone is inputted from each selection unit 406-m, the delay unit 424-(m, L+α) continuously outputs the frequency component $r_{k, m, L+\alpha}(n)$ of an (L+α−1)th chip giving a delay of $T_c$ to each register 440-m, L+α and stores the frequency component therein.

Note that, likewise, each of the other delay units 424 also continuously output the frequency component $r_{k, m, l}$ to a corresponding register 440. The operation of the filter unit 4 is stabilized by continuously outputting a value to each register 440 during the time period of $T_c$.

Moreover, each delay unit 424-(m, L+α) sequentially gives a delay of $T_c$ to the frequency component $r_{k, m, L+\alpha}(n)$ inputted from each selection unit 406-m at a cycle of $T_c$ and outputs the result to each delay unit 424-(m, L+α−1) at the subsequent stage.

When each of the (L+α−1) to second frequency component $r_{k, m, L+\alpha-1}(n)$ to $r_{k, m, 2}(n)$ is inputted from each of the delay units 424-(m, L+α) to 424-(m, 3) at the previous stage, each of the delay units 424-(m, L+α−1) to 424-(m, 2) outputs the (L+α−2) to first frequency components $r_{k, m, L+\alpha-2}(n)$ to $r_{k, m, 1}(n)$ giving a delay of $T_c$ at the previous stage to the register 440-m, 1 and stores it therein.

In addition, each of the delay units 424-(m, L+α−1) to 424-(m, 2) sequentially gives a delay of $T_c$ to the (L+α) to third frequency components $r_{k, m, L+\alpha}(n)$ to $r_{k, m, 3}(n)$ inputted from each of the delay units 424-(m, L+α) to 424-(m, 3) at the previous stage at a cycle of $T_c$ and outputs the result to each of the delay units 424-(m, L+α−2) to 424-(m, 1) at the following stage.

When each second frequency component $r_{k, m, 2}(n)$ is inputted from each delay unit 424-(m, 2) at the previous stage, each delay unit 424-(m, 1) outputs the first frequency component $r_{k, m, 1}(n)$ giving a delay of $T_c$ at the previous stage to each register 440-m, 1 and stores the frequency component therein.

Each register 440-m, 1 holds the frequency component $r_{k, m, l}(n)$ inputted from the delay unit 424-m, 1 and outputs the frequency component to each multiplication unit 442-m, 1. Each coefficient storage unit 444-m, 1 holds each element m, 1 (weight $w_{k, m, l}$) of the weight matrix $(W_k)$ set by the weight updating unit 342 (FIG. 6) and outputs the element to each multiplication unit 442-m, 1.

Each multiplication unit 442-(m, L+α) performs complex multiplication on each of the frequency components $r_{k, m, L+\alpha}(n)$ inputted from the registers 440-(m, L+α), each of the weight $w_{k, m, L+\alpha}$, and each of the complex conjugate numerical values $w^*_{k, m, L+\alpha}$, and outputs the multiplication results to each addition unit 428-(m, L+α−1). Each of the multiplication units 442-(m, L+α−1) to 442-(m, 1) performs complex multiplication on each of the frequency components $r_{k, m, L+\alpha}(n)$ to $r_{k, m, 1}(n)$, each of the weights $w_{k, m, L+\alpha}$ to $w_{k, m, 2}$, and each of the complex conjugate numerical values $w^*_{k, m, L+\alpha}$ to $w^*_{k, m, l}$, and outputs the multiplication results to each of the addition units 428-(m, L+α−1) to 428-(m, 1).

Each of the addition units 428-(m, L+α−1) to 428-(m, 2) performs complex addition on the multiplication results inputted from each of the multiplication units 442-(m, L+α−1) to 442-(m, 2) and the addition results inputted from each of the addition units 428-(m, L+α) to (m, 3), and outputs the addition results to each of the addition units 428-(m, L+α−2) to 428-(m, 1).

The addition unit 428-(m, 1) performs complex addition on the multiplication results inputted from the multiplication unit 442-(m, 1) and the addition results inputted from the addition unit 428-(m, 2) and outputs the addition results to the total sum calculation unit 412.

The total sum calculation unit 412 calculates the total sum of the addition results inputted from the addition unit 428-(m, 1) and outputs complex filter output data $d'_k(n)$ to the selection unit 414.

The selection unit 414 selects the filter output data $d'_k(n)$ calculated by the total sum calculation unit 412, and outputs the data to the demodulation unit 322 (FIG. 6). The received signal matrix generation unit 340 generates an (L+α)×M received signal matrix $R_k(n)$ from all frequency components for decoding an nth symbol outputted from each LPF 404-m, namely, the frequency components $r_{k, m, 1}(n)$ to $r_{k, m, L}(n)$ and a part of the frequency components $r_{k, m, 1}(n+1)$ (in the case of L>α, the frequency components $r_{k, m, 1}(n+1)$ to $r_{k, m, \alpha}(n+1)$ are also written as the frequency components $r_{k, m, L+1}(n)$ to $r_{k, m, L+\alpha}(n)$), and outputs the received signal matrix $R_k(n)$ to the weight updating unit 342.

The weight updating unit 342 processes the received signal matrix $R_k(n)$ inputted from the received signal matrix generation unit 340, for example, using an N-LMS (normalized least mean square) algorithm.

The weight updating unit 342 uses the above processing results and error data $e_k(n)$ inputted from the addition unit 320 to optimize the weight $w_{k, m, l}$ contained in the weight matrix $(W_k)$ so as to decode the message symbol $b_k(n)$ from the transmission signal $r_k(t)$ received from the transmitting device 2-k with better performance.

The first hopping pattern generation unit 344 extracts a portion corresponding to the hopping pattern corresponding portion 422 among the weight $w_{k, m, l}$ updated by the weight updating unit 342 to generate a hopping pattern $P_k$ containing the weights $w_{k, m, 1}$ to $w_{k, m, L}$ and outputs the pattern to the hopping pattern transmission unit 346.

The first hopping pattern transmission unit 346 outputs the message symbol $b_k(n)$ indicating the hopping pattern $P_k$ inputted from the hopping pattern generation unit 344 to the transmitting program 22 (FIG. 4) executed by the receiving device 3-$k$ so as to be transmitted to the transmitting device 2-$k$ via the A/D 212, the RF 208 and the antenna 210.

The demodulation unit 322 performs a process using a signum function (sgn(x); also called a code function) on the filter output data d'$_k$(n) received from the filter unit 4 to obtain complex reference data d"$_k$ as a processing result, and outputs the reference data to the delay unit 324 and the multiplication unit 326.

Note that the signum function sgn(x) is defined such that: if x is positive (x>0), +1 is returned; if x is negative (x<0), −1 is returned; and if x=0, 0, +1 or −1 is appropriately returned.

Note that since x=0 is generally unlikely due to noise, there is no practical need to define the value returned by the signum function in the case of x=0.

The delay unit 324 delays, by precisely $T_s$, the reference data d"$_k$(n) outputted from the demodulation unit 322 and outputs the reference data to the multiplication unit 326.

Note that as will be discussed later as a performance evaluation of the communication system 1, the weight adjustment (training) of the filter unit 4 is performed using known data (pilot) stored in advance in the transmitting device 2 and the filter unit 4, the above described process (differential decoding) by the demodulation unit 322 and the delay unit 324 is not required.

In this case, in the receiving device 3, the reference data d"$_k$(n) is assumed to be a demodulated message symbol b$_k$(n).

The multiplication unit 326 multiplies the reference data d"$_k$(n) inputted from the demodulation unit 322 and the reference data d"$_k$(n−1) delayed by the delay unit 324 to decode the message symbol b$_k$(n), and outputs the message symbol b$_k$(n) to a network or the like connected to the receiving device 3-$k$.

The addition unit 320 subtracts the filter output data d'$_k$(n) outputted from the processing result data filter unit 4 from the reference data d"$_k$(n) outputted from the demodulation unit 322 to generate error data e$_k$(n) and outputs the error data e$_k$(n) to the weight updating unit 342.

[Communication Between Transmitting Device 2-$k$ and Receiving Device 3-$k$]

Hereinafter, the communication between the transmitting device 2-$k$ and the receiving device 3-$k$ which transmit a message symbol b$_k$(n) to each other as a pair in the communication system 1 (FIG. 1) will be described.

[Transmitting Device 2-$k$]

First, processing in the transmitting device 2-$k$ will be described.

In the transmitting device 2-$k$, the multiplication unit 222 of the transmitting program 22 (FIG. 4) receives the message symbol b$_k$(n) from a network or the like.

The multiplication unit 222 and the delay unit 224 processes the inputted message symbol b$_k$(n) to generate a differentially encoded complex symbol d$_k$(n) and outputs the symbol d$_k$(n) to the delay unit 224.

The differentially encoded complex symbol d$_k$(n) is defined as d$_k$(n)=b$_k$(n) d$_k$(n−1) using an nth inputted message symbol b$_k$(n) and an (n−1)th generated differentially encoded complex symbol d$_k$(n−1).

Meanwhile, the hopping pattern setting unit 242 sets an initial value of the hopping pattern P$_k$ or the hopping pattern P$_k$ updated by the receiving device 3-$k$ of the communication party and received by the hopping pattern receiving unit 240, to the frequency synthesizer unit 244.

Based on the set hopping pattern P$_k$, the frequency synthesizer unit 244 generates a signature wave signal c$_k$(t) defined by the following expression 2 and outputs the signal c$_k$(t) to the multiplication unit 226.

[Expression 2]

$$c_k(t) = \sum_{l=1}^{L} a_{k,l}(t - (l-1)T_c) \quad (2)$$

In the expression 2, $T_o$ denotes a time length of the chip illustrated in FIG. 5 and is defined as $T_c$>t>0, and $\alpha_{k,l}(t)$ defines an lth chip wave defined by the following expression 3.

[Expression 3]

$$a_{k,l}(t) = g(t)\sum_{m=1}^{M} p_{k,l,m} e^{j2\pi\xi_m t} \quad (3)$$

In the expression 3, a rectangular function g(t) is defined by the following expression 4.

[Expression 4]

$$g(t) = \begin{cases} 1 & (0 < t < T_c) \\ 0 & (\text{otherwise}) \end{cases} \quad (4)$$

Meanwhile, as described above, the frequency hopping pattern P$_k$ used to spread spectrum of the message symbol b$_k$(n) in the transmitting device 2-$k$ can be defined as an M×L matrix represented by the following expression 5.

Note that in the expression 5, L denotes the number of chips contained in one message symbol illustrated in FIG. 5, and M denotes the number of tones used for frequency hopping.

[Expression 5]

$$P_k = \begin{bmatrix} p_{k,1,1} & p_{k,1,2} & \cdots & p_{k,1,M} \\ p_{k,2,1} & p_{k,2,2} & \cdots & p_{k,2,M} \\ \vdots & \vdots & \ddots & \vdots \\ p_{k,L,1} & p_{k,L,2} & \cdots & p_{k,L,M} \end{bmatrix} \quad (5)$$

The multiplication unit 226 multiplies the signature wave signal c$_k$(t) inputted from the hopping pattern setting unit 242 and the differentially encoded complex symbol d$_k$(n) inputted from the multiplication unit 222 to generate a transmission signal s$_k$(t) defined by the following expression 6 as a multiplication result and outputs the transmission signal s$_k$(t) to the D/A 206.

The D/A 206, the RF 208, and the antenna 210 (FIG. 3) transmit the inputted transmission signal s$_k$(t) to the receiving device 3-$k$ of the communication party.

[Expression 6]

$$s_k(t) = \sum_{n=0}^{\infty} d_k(n) c_k(t - nT_s) \quad (6)$$

Note that in the expression 6, $T_s$ denotes a code time length of the message symbol b$_k$(n) illustrated in FIG. 5 and is defined as $LT_s = T_c$.

Moreover, the expression 6 indicates differentially encoded complex symbol $d_k(n)=b_k(n) \cdot d_k(n-1)$ transmitted during $nT_s > t > (n-1) T_s$.

As described above, the message symbol $b_k(n)$ is generated, for example, assuming that a QPSK modulation system is used.

[Transmission Path Between Transmitting Device 2-k and Receiving Device 3-k]

Next, a non-target signal received by the transmitting device 2-k illustrated in FIG. 1 and the like will be described.

In the communication system 1, a transmission signal is transmitted independently in each pair of communication devices.

In this case, transmission signals received by the receiving device 3-k from the transmitting devices 2-1 to 2-(k−1) and 2-(k+1) to 2-K are as illustrated in FIG. 2.

In other words, the receiving device 3-k receives not only a transmission signal from the receiving device 3-k of the communication party but also unwanted signals from the transmitting devices 2-k' of other pairs as well as noise.

Note that in FIG. 2, $h_{k',k}(t)$ denotes a complex impulse response function which the wireless transmission path from the transmitting device 2-k' to the receiving device 3-k gives to a transmission signal from the transmitting device 2-k' to the receiving device 3-k, and is defined by the following expression 7.

In addition, in FIG. 2, AWGN denotes an additive white Gaussian noise which the receiving device 3-k receives together with the transmission signals.

Note that in the expression 7, $h_{k,k',i}$ denotes a complex gain constant defined in an ith transmission path, and $T_{k',k,i}$ ($T_c > \tau_{k',k,i} > 0$) denotes a delay occurring in an ith transmission path.

In addition, in the expression 7, $I_{k',k}$ denotes the number of paths contained in the wireless transmission path from the transmitting device 2-k to the receiving device 3-k.

[Expression 7]

$$h_{k',k}(t) = \sum_{i=1}^{I_{k',k}} h_{k',k,i} \delta(t - \tau_{k',k,i}) \tag{7}$$

The transmission signal $r_k(t)$ received by the receiving device 3-k is formulated by the following expressions 8-1 and 8-2.

[Expression 8]

$$r_k(t) = \sum_{k'=1}^{K} (s_{k'}(t) * h_{k',k}(t)) + n(t) \tag{8-1}$$

$$= \sum_{k'=1}^{K} \sum_{n=0}^{\infty} \sum_{i=1}^{I_{k',k}} h_{k',k,i} d_k(n) c_k(t - nT_s - \tau_{k',k,i}) + n(t) \tag{8-2}$$

[Receiving Device 3-k]

Next, processing in the receiving device 3-k will be described.

In the receiving device 3-k, the RF 208 (FIG. 3) receives a transmission signal $r_k(t)$ represented in the expressions 8-1 and 8-2 via the antenna 210, converts the transmission signal to a transmission signal $s_k(t)$ of a baseband or an intermediate frequency processable by the DSP 202 and the like, and outputs the transmission signal $s_k(t)$ to the A/D 212.

The A/D 212 converts the transmission signal $r_k(t)$ inputted from the RF 208 to a digital transmission signal $r_k(t)$ and outputs the transmission signal $r_k(t)$ to the DSP 202 and the like.

The receiving program 30 (FIGS. 6 to 8) is executed at the DSP 202 and the like in the receiving device 3-k.

In the filter unit 4 of the receiving program 30, the multiplication unit 402-m multiplies the inputted transmission signal $r_k(t)$ by a function $e^{-j2\pi\xi_m t}$ and outputs a multiplication result $r(t)e^{-j2\pi\xi_m t}$ to the LPF 404-m.

Each LPF 404-m sequentially integrates the multiplication result $r(t)e^{-j2\pi\xi_m t}$ during $nT_s+(l-1)T_c+\tau_{k',k,i}$ to $nT_s+lT_c+\tau_{k',k,i}$ as represented by the following expressions 9-1 and 9-2, and outputs the result to the weighting unit 420.

As a result of integration by the LPF 404-m, as represented by the following expressions 9-1 and 9-2, an mth tone component contained in the transmission signal $r_k(t)$ is separated individually.

[Expression 9]

$$r_{k,l,m}(n) = \int_{nT_s+(l-1)T_c+\tau_{k,k,1}}^{nT_s+lT_c+\tau_{k,k,1}} r_k(t) e^{-j2\pi\xi_m t} dt \tag{9-1}$$

$$= \int_{nT_s+(l-1)T_c+\tau_{k,k,1}}^{nT_s+lT_c+\tau_{k,k,1}} r_k(t) e^{-j\frac{2\pi(m-1)}{T_c} t} dt \tag{9-2}$$

Note that as described above, the expressions 9-1 and 9-2 assume $L+\alpha \geq l \geq 1$, and $\xi_m$(Hz) denotes an mth tone frequency in the spectrum-spread transmission signal and is defined as $\xi_m=(m-1)/T_c$(Hz).

The received signal matrix generation unit 340 generates a received signal matrix $R_k(n)$ defined by the following expression 10 from the frequency components $r_{k,m,1}(n), r_{k,m,1}(n+1)$ obtained in the time length t ($nT_s+(L+\alpha) T_c+\tau_{k',k,i} > t > nT_s+\tau_{k',k,i}$).

[Expression 10]

$$R_k(n) = \begin{bmatrix} r_{k,1,1}(n) & r_{k,1,2}(n) & \cdots & r_{k,1,M}(n) \\ r_{k,2,1}(n) & r_{k,2,2}(n) & \cdots & r_{k,2,M}(n) \\ \vdots & \vdots & \ddots & \vdots \\ r_{k,L,1}(n) & r_{k,L,2}(n) & \cdots & r_{k,L,M}(n) \\ r_{k,1,1}(n+1) & r_{k,1,2}(n+1) & \cdots & r_{k,1,M}(n+1) \\ r_{k,2,1}(n+1) & r_{k,2,2}(n+1) & \cdots & r_{k,2,M}(n+1) \\ \vdots & \vdots & \ddots & \vdots \\ r_{k,\alpha,1}(n+1) & r_{k,\alpha,2}(n+1) & \cdots & r_{k,\alpha,M}(n+1) \end{bmatrix} \tag{10}$$

Meanwhile, filter output data $d'_k(n)$ outputted from the filter unit 4 is defined by the following expression 11.

Note that in the expression 11, H denotes a complex conjugate and a transposition of the matrix, and tr denotes a trace of the matrix.

[Expression 11]

$$d'_k(n) = tr[W_k^H(n) R_k(n)] \tag{11}$$

The demodulation unit 322 performs a process using a signum function on the filter output data $d'_k(n)$ as represented by the following expression 12 to generate reference data $d''_k(n)$.

Note that in the expression 12, sgn denotes a signum function, Re[x] denotes a real number component of a complex number x, and Im[x] denotes an imaginary number component of the complex number x.

[Expression 12]

$$d''k(n) = sgn[Re[d'_k(n)]] j sgn[Im[d'_k(n)]] \quad (12)$$

The multiplication unit 326 performs complex multiplication on nth reference data d''$_k$(n) and (n−1)th reference data d''$_k$(n) as represented by the following expressions 13-1 to 13-3 to obtain a message symbol b'$_k$(n).

[Expression 13]

$$b'_k(n) = d''k(n) d''k*(n-1) \quad (13-1)$$
$$= (sgn[Re[d'_k(n)]] + j sgn[Im[d'_k(n)]]) \quad (13-2)$$
$$\times (sgn[Re[d'_k(n-1)]] - j sgn[Im[d'_k(n-1)]]) \quad (13-3)$$

The addition unit 320 subtracts the filter output data d'$_k$(n) outputted from the filter unit 4 from the reference data d''$_k$(n) outputted from the demodulation unit 322 to generate error data e$_k$(n) defined by the following expression 14, and outputs the error data e$_k$(n) to the weight updating unit 342.

As will be apparent from the generation method thereof, the error data e$_k$(n) indicates the difference between the reference data d''$_k$(n) and the filter output data d'$_k$. The weight updating unit 342 updates and optimizes the weight so as to minimize the value of the error data e$_k$(n), namely, so that the value of the reference data d''$_k$(n) approaches the value of the filter output data d'$_k$.

[Expression 14]

$$e_k(n) = d''_k(n) - tr[W_k^H(n) R_k(n)] \quad (14)$$

The weight updating unit 342 uses the received signal matrix R$_k$(n) and the error data e$_k$(n) as represented by the following expression 16 to update the weight matrix W$_k$(n) defined by the following expression 15 to process an nth message symbol b$_k$(n) of the filter unit 4, generates a weight matrix W$_k$(n+1) used to process an (n+1) th or subsequent message symbol b$_k$, and outputs the weight matrix to the coefficient setting unit 410 of the filter unit 4 and the hopping pattern generation unit 344.

[Expression 15]

$$W_k = \begin{bmatrix} w_{k,1,1} & w_{k,1,2} & \cdots & w_{k,1,M} \\ w_{k,2,1} & w_{k,2,2} & \cdots & w_{k,2,M} \\ \vdots & \vdots & \ddots & \vdots \\ w_{k,L,1} & w_{k,L,2} & \cdots & w_{k,L,M} \\ w_{k,L+1,1} & w_{k,L+1,2} & \cdots & w_{k,L+1,M} \\ w_{k,L+2,1} & w_{k,L+2,2} & \cdots & w_{k,L+2,M} \\ \vdots & \vdots & \ddots & \vdots \\ w_{k,L+\alpha,1} & w_{k,L+\alpha,2} & \cdots & w_{k,L+\alpha,M} \end{bmatrix} \quad (15)$$

[Expression 16]

$$W_k(n+1) = W_k(n) + \frac{\mu}{\|R_k(n)\|_F^2} R_k(n) e_k^*(n) \quad (16)$$

Note that //R$_k$(n)//$_F$ in the expression 15 denotes a Frobenius norm of a received signal matrix R$_k$(n) defined by the following expression 17.

[Expression 17]

$$\|R_k(n)\|_F = \sqrt{\sum_{l=1}^{L+\alpha} \sum_{m=1}^{M} |r_{k,l,m}(n)|^2} . \quad (17)$$

Each time the weight updating unit 342 updates the weight matrix W$_k$(n+1), the coefficient setting unit 410 sets the element m, l(weight w$_{k,m,l}$(n)) of a new weight matrix W$_k$(n+1) to each coefficient storage unit 444-m, 1 of the coefficient multiplication units 44-(m, l) at, for example, the boundary of a message symbol inputted to the filter unit 4.

Note that as the initial value of the weight matrix W$_k$, for example, the weight matrix W$_k$(0) defined by the following expression 18 is used.

In the expression 18, T denotes a transposition of the matrix and 0$_{+\times M}$T denotes a zero matrix with a size of α×M.

[Expression 18]

$$W_k(0) = [P_k^T(0) 0_{\alpha \times M}]^T. \quad (18)$$

The filter unit 4 uses the weight matrix W$_k$(n+1) updated as described above to perform filtering on a next (n+1) th transmission signal r$_k$(t). The decoding unit 32 processes the filter output data d'$_k$(n+1) outputted from the filter unit 4 to decode the message symbol b'$_k$(n) corresponding to the message symbol b$_k$(n) processed by the transmitting program 22 executed at the transmitting device 2-k.

[Feedback of Hopping Pattern P$_k$]

Hereinafter, a feedback process of a hopping pattern P$_k$ from the receiving device 3-k to the transmitting device 2-k will be described.

The hopping pattern generation unit 344 of the receiving program 30 executed at the receiving device 3-k extracts a part of the weight matrix W$_k$ inputted from the weight updating unit 342 corresponding to the hopping pattern corresponding portion 422 (FIG. 7) as represented by the expressions 19-1 and 19-2 to generate a new hopping pattern P$_k$(λ), and outputs the hopping pattern P$_k$(λ) to the hopping pattern transmission unit 346.

Note that hereinafter, in the present description, the hopping pattern P$_k$(λ) will also be denoted as the hopping pattern P$_k$ by omitting the (λ).

[Expression 19]

$$P_k(\lambda) \triangleq \begin{pmatrix} p_{k,1,1} & p_{k,1,2} & \cdots & p_{k,1,M} \\ p_{k,2,1} & p_{k,2,2} & \cdots & p_{k,2,M} \\ \vdots & \vdots & \ddots & \vdots \\ p_{k,L,1} & p_{k,L,2} & \cdots & p_{k,L,M} \end{pmatrix} \quad (19-1)$$

$$= \begin{pmatrix} w_{k,1,1}(\hat{n}_k) & w_{k,1,2}(\hat{n}_k) & \cdots & w_{k,1,M}(\hat{n}_k) \\ w_{k,2,1}(\hat{n}_k) & w_{k,2,2}(\hat{n}_k) & \cdots & w_{k,2,M}(\hat{n}_k) \\ \vdots & \vdots & \ddots & \vdots \\ w_{k,L,1}(\hat{n}_k) & w_{k,L,2}(\hat{n}_k) & \cdots & w_{k,L,M}(\hat{n}_k) \end{pmatrix} \quad (19-2)$$

Note that the expressions 19-1 and 19-2 exemplifies a case where the hopping pattern P$_k$ is fed back from the receiving device 3-k to the transmitting device 2-k at a time t=λT$_f$+Δ$_k$+αT$_c$+τ$_{k,k,1}$.

In the expressions 19-1 and 19-2, X is defined as N$_f$≧λ≧1, N$_f$ denotes the number of times the feedback is repeated, T$_f$ denotes a time interval of the feedback, and Δ$_k$(T$_f$≧Δ$_k$≧0) denotes an offset time determined in advance for feedback timing.

Note that in the expressions 19-1 and 19-2, a transmission delay from the receiving device 3-k to the transmitting device 2-k is ignored.

Moreover, in the expressions 19-1 and 19-2, the symbol represented by the following expression 20 is defined by the following expression 21.

In the expression 21, {q} denotes a maximum positive integer equal to or less than q.

[Expression 20]

$$\hat{n}_k \quad (20)$$

[Expression 21]

$$\hat{n}_k \cdot \{(\lambda T_f + \Delta_k + \alpha T_c + \tau_{k,k,1})/T_s\} \quad (21)$$

The hopping pattern transmission unit 346 transmits the new hopping pattern $P_k$ inputted from the hopping pattern generation unit 344 to the transmitting device 2-$k$ via the A/D 212, the RF 208 and the antenna 210 (FIG. 3) as illustrated in FIG. 2.

In the transmitting program 22 executed at the transmitting device 2-$k$, the hopping pattern receiving unit 240 receives the hopping pattern $P_k$ from the receiving device 3-$k$ and outputs the hopping pattern $P_k$ to the hopping pattern setting unit 242.

The hopping pattern setting unit 242 sets the hopping pattern $P_k$ to the frequency synthesizer unit 244 to cause the frequency synthesizer unit 244 to generate the signature wave signal $c_k(t)$ based on the hopping pattern $P_k$ and perform spread spectrum on the message symbol $b_k(n)$.

Note that the initial value $P_k(0)$ of the hopping pattern $P_k$ set by the frequency synthesizer unit 244 is sequentially optimized by updating the hopping pattern $P_k$ described above, and thus, for example, may be a value determined in advance by experiment or may be a random value.

In the communication system 1 configured as described above, data transmission between the transmitting device 2-$k$ and the receiving device 3-$k$ can minimize ISI (intersymbol interference) and MAI (multiple access interference).

Moreover, an update of the hopping pattern $P_k$ of the transmitting device 2-$k$ allows the reference data $d''_k(n)$ to achieve an MMSE (minimum mean-squared error) in accordance with the update.

Therefore, according to the update of the hopping pattern $P_k$ described above, data transmission with an extremely small bit error rate (BER) can be provided between the transmitting device 2-$k$ and the receiving device 3-$k$.

[Overall Operation of Transmitting Device 2-$k$ and Receiving Device 3-$k$]

Hereinafter, an overall operation of data transmission between the transmitting device 2-$k$ and the receiving device 3-$k$, the feedback of a hopping pattern $P_k$, and updating thereof according to the first communication system 1 will be described.

Figure 9:
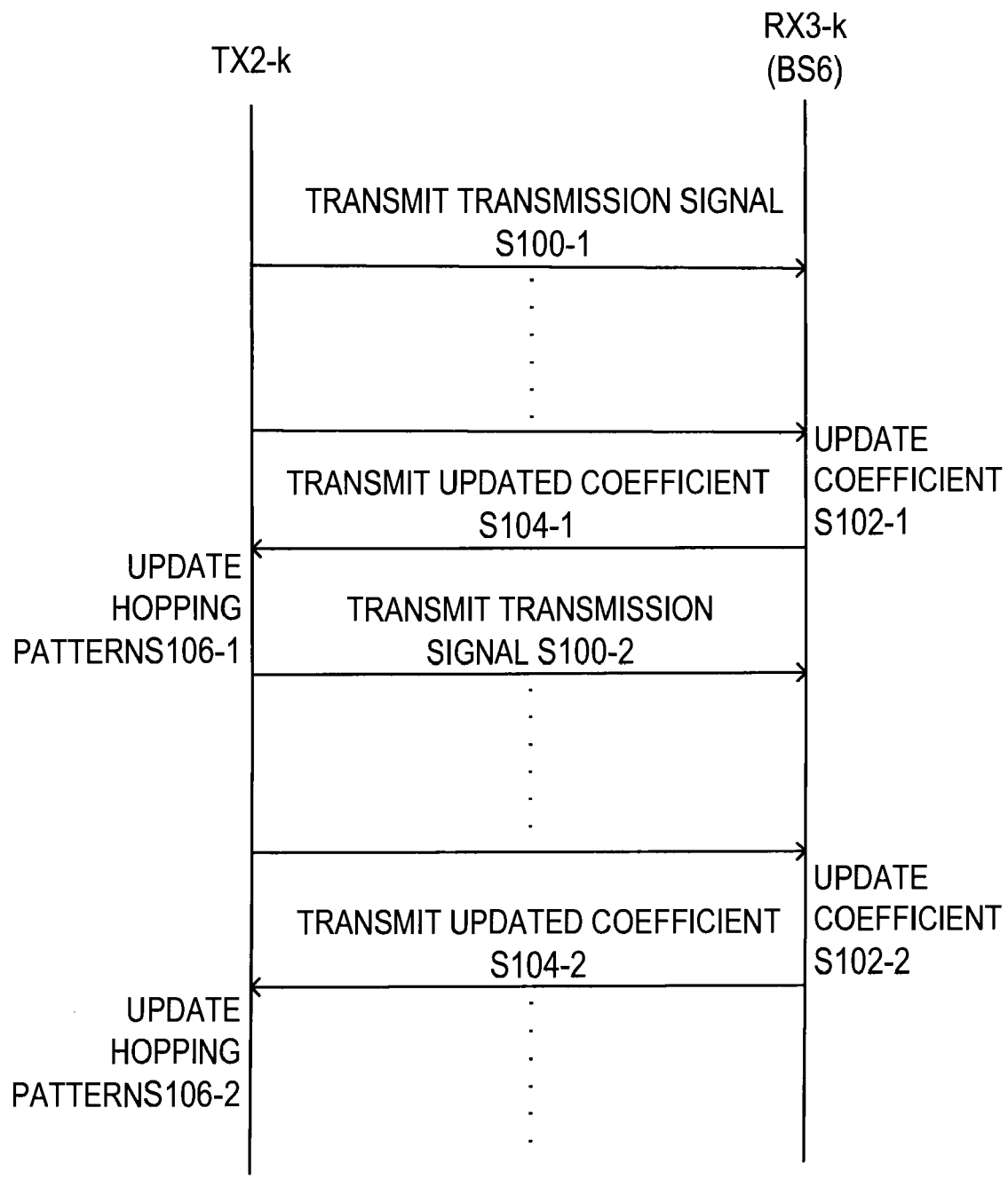

FIG. 9 illustrates a communication sequence diagram illustrating the data transmission and the feedback (S10) of the hopping pattern $P_k$ between the transmitting device 2-$k$ and the receiving device 3-$k$ illustrated in FIG. 1 and the like.

In step 100-1 (S100-1), the transmitting device 2-$k$ transmits a transmission signal $s_k(t)$ to the receiving device 3-$k$ a plurality of number of times.

In step 102-1 (S102-1), the receiving device 3-$k$ updates a weight matrix $W_k$ and the hopping pattern $P_k$ at the time intervals described with reference to the expressions 19-1 and 19-2.

In step 104-1 (S104-1), the receiving device 3-$k$ transmits and feeds back the updated hopping pattern $P_k$ to the transmitting device 2-$k$.

In step 106-1 (S106-1), the transmitting device 2-$k$ updates the hopping pattern $P_k$ by replacing the previous hopping pattern $P_k$ with the new hopping pattern $P_k$ received from the receiving device 3-$k$ and uses the updated hopping pattern $P_k$ for spread spectrum.

The above described process is repeated, for example, $N_f$ number of times between the transmitting device 2-$k$ and the receiving device 3-$k$.

[Variation]

Hereinafter, a variation of the communication system (FIG. 1 or the like) will be described.

A description has been made such that a feedback and an update of the hopping pattern $P_k$ are repeated $N_f$ number of times between the transmitting device 2-$k$ and the receiving device 3-$k$. However, for example, the number of times of the feedback and the update is not limited. Rather, the feedback and the update may be performed at a constant time interval or at random times.

Moreover, as illustrated by dotted lines in FIG. 6, the receiving program 30 may be configured such that a quality measurement unit 360 which measures the signal intensity or the SN (signal noise) ratio of the transmission signal $r_k(t)$ is added to the receiving program 30, and when the transmission signal quality becomes lower than a specified level, the updating unit 34 performs a feedback and an update of the hopping pattern $P_k$ to improve the transmission signal quality.

Moreover, if the message symbol $b_k(n)$ contains an error detection code, as illustrated by dotted lines in FIG. 6, the receiving program 30 may be configured such that an error rate measurement unit 362 which measures the error rate of the message symbol $b'_k(n)$ obtained by decoding is added to the receiving program 30, and when the error rate of the message symbol $b'_k(n)$ reaches or exceeds a specified level, the updating unit 34 performs a feedback and an update of the hopping pattern $P_k$ to reduce the error rate.

Moreover, a description of a specific example has been given in the first embodiment such that in the communication system 1, the transmitting device 2 and the receiving device 3 use frequency hopping to spread spectrum of the message symbol $b_k(n)$. However, for example, the communication system 1 may be configured such that the transmitting device 2 and the receiving device 3 use a hopping pattern made of two time domains or frequency components to perform an update and a feedback of the hopping pattern.

Moreover, a description of a specific example has been given in the first embodiment such that in the communication system 1, the weight matrix $W_k$ is optimized by the N-LMS algorithm to update the hopping pattern $P_k$, but the update optimization algorithm may be appropriately changed to another algorithm depending on the configuration and the application of the communication system 1 and the performance of the DSP 202 and the like.

EXAMPLES

Hereinafter, a specific example of the communication system according to the present application described above will be described by focusing on how the communication system 1 can improve the transmission performance between the transmitting device 2-$k$ and the receiving device 3-$k$.

First, as the initial value of a hopping pattern $P_k$, a hopping pattern $P_k(0)$ where L=7 and M=8 using frequency hopping codes proposed in Address Assignment for a Time-Frequency-Coded Spread-Spectrum System (G. Einarson, Bell Syst. Tech. J., vol. 59, no. 7, pp. 1241-1255, September 1980) and M number of Gold sequences with a length of L are used.

A frequency hopping code $y_k$ of the hopping pattern $P_k(0)$ is defined by the following expressions 22-1 and 22-2.

[Expression 22]

$$y_k = x_k \cdot \beta \oplus \gamma_k \cdot 1 \quad (22-1)$$

$$= [y_{k,1} y_{k,2} \ldots y_{k,L}]^T \quad (22-2)$$

In the expression 22, $\beta = [\beta^0, \beta^1, \beta^2, \ldots, \beta^{L-1}]$, $\beta$ denoting an initial element of $GF(M=2^3)$; $x_k, \gamma_k \in GF(2^3)$, and 1 denotes a column vector with 1 number of total elements and having a length of L.

In the expression 22, the symbol and "●" shown in the expression 23 denote addition and multiplication with respect to $GF(2^3)$ respectively.

[Expression 23]

$$\oplus \quad (23)$$

Values of $x_k$, $\gamma_k$ with respect to a kth signal is obtained by $(k-1) = \gamma_k + x_k$.

An element $v_{k,l,m}$ of (l, m) of an L×M matrix $V_k$ is defined by the following expression 24.

[Expression 24]

$$v_{k,l,m} = \begin{cases} 1 & (m = y_{k,l} + 1) \\ 0 & (m \neq y_{k,l} + 1) \end{cases} \quad (24)$$

Here, when M number of diagonal matrix sets $Z_0, Z_1, \ldots Z_{M-1}$ each containing M number of Gold sequences on a diagonal line thereof are defined, the initial hopping pattern $P_k(0)$ can be defined as $P_k(0) = Z_{xk} V_k$.

For example, if k=2, $y_2$, $V_2$, $Z_{xk}=2$, then $P_k(0)$ is as represented by the following expressions 25 to 27, 28-1, and 28-2.

[Expression 25]

$$y_2 = [1\ 2\ 4\ 3\ 6\ 7\ 5]^T \quad (25)$$

[Expression 26]

$$V_2 = \begin{bmatrix} 0 & 1 & 0 & 0 & 0 & 0 & 0 \\ 0 & 0 & 1 & 0 & 0 & 0 & 0 \\ 0 & 0 & 0 & 0 & 1 & 0 & 0 \\ 0 & 0 & 0 & 1 & 0 & 0 & 0 \\ 0 & 0 & 0 & 0 & 0 & 1 & 0 \\ 0 & 0 & 0 & 0 & 0 & 0 & 1 \\ 0 & 0 & 0 & 0 & 1 & 0 & 0 \end{bmatrix} \quad (26)$$

[Expression 27]

$$Z_{x_2=1} = \begin{bmatrix} + & 0 & 0 & 0 & 0 & 0 & 0 \\ 0 & + & 0 & 0 & 0 & 0 & 0 \\ 0 & 0 & - & 0 & 0 & 0 & 0 \\ 0 & 0 & 0 & + & 0 & 0 & 0 \\ 0 & 0 & 0 & 0 & + & 0 & 0 \\ 0 & 0 & 0 & 0 & 0 & + & 0 \\ 0 & 0 & 0 & 0 & 0 & 0 & - \end{bmatrix} \quad (27)$$

[Expression 28]

$$P_2(0) = Z_{x_2=1} V_2 \quad (28-1)$$

$$= \begin{bmatrix} 0 & + & 0 & 0 & 0 & 0 & 0 \\ 0 & 0 & + & 0 & 0 & 0 & 0 \\ 0 & 0 & 0 & 0 & - & 0 & 0 \\ 0 & 0 & 0 & + & 0 & 0 & 0 \\ 0 & 0 & 0 & 0 & 0 & + & 0 \\ 0 & 0 & 0 & 0 & 0 & 0 & + \\ 0 & 0 & 0 & 0 & - & 0 & 0 \end{bmatrix} \quad (28-2)$$

Figure 10:
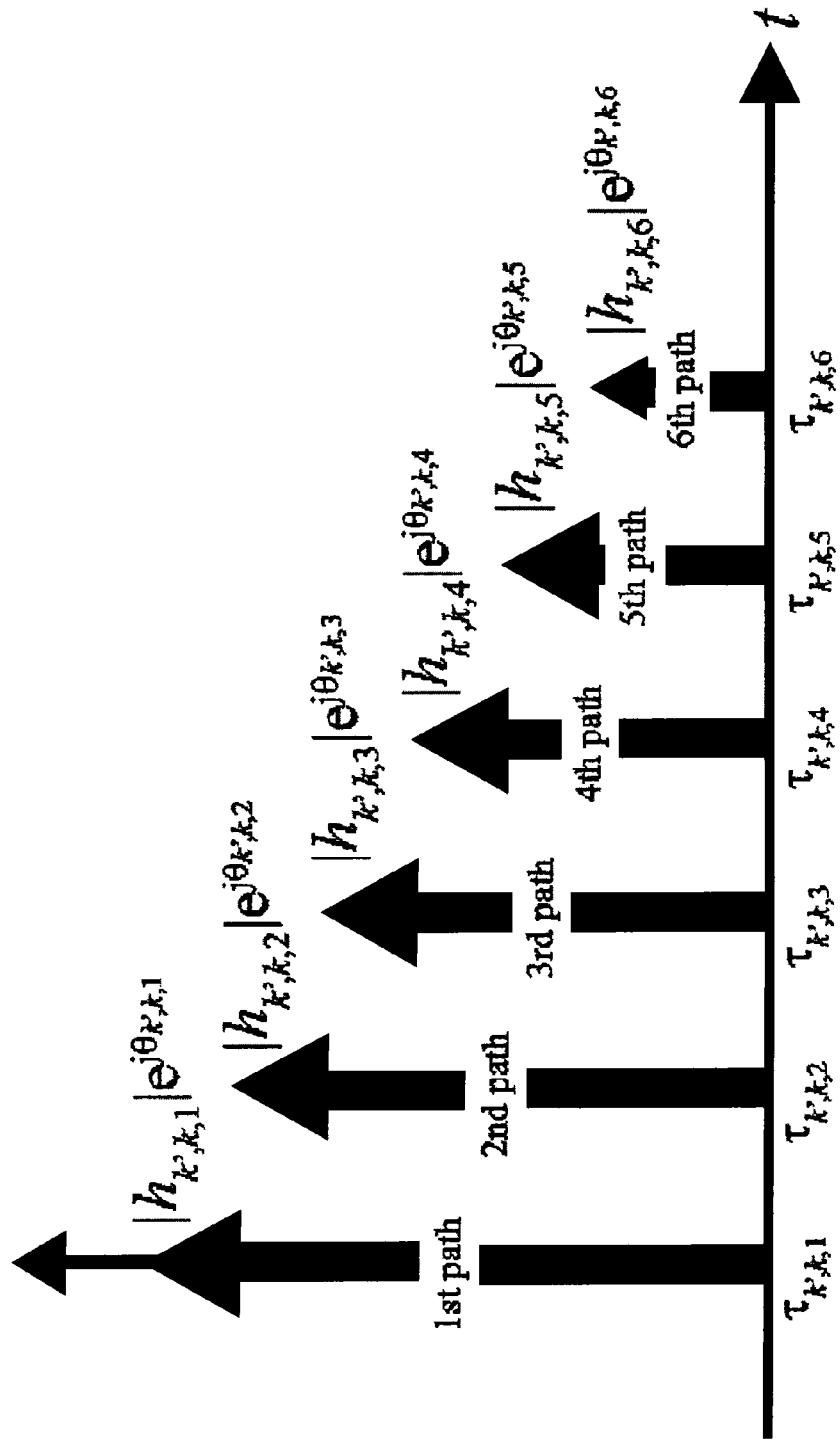
FIG. 10 illustrates a model of a wireless transmission path for evaluating the performance of the communication system.

FIG. 10 illustrates a model of a wireless transmission path for evaluating the performance of the communication system 1.

Further, in order to evaluate the performance of the communication system 1, as illustrated in FIG. 10, a six-path model indicating an exponential decay performance is assumed ($I_{k',k}=6$ for every k, k').

As illustrated in FIG. 10, relative intensities $|h_{k',k,i}|$ are $20 \log_{10} |h_{k',k,i+1}|/|h_{k',k,i}| = -3$ dB (where i=1, 2, ..., $I_{k',k}-1$)).

Path delays $\tau_{k',k,i}$ are $\tau_{k',k,i+1} - \tau_{k',k,i} = (L+1)T_c/16$ (for ≈ $T_s/16$; L=7). $\tau_{k',k,1}$ for all k', k and $\theta_{k,k,i+1}$ for all k', k, i are statistically independent of each other and are uniformly distributed random variables in intervals of [0,T) and [0,2π).

Note that for simplifying the assumption, as described above, amplitude attenuation is assumed to be the same −3 dB for all k', k, and $\tau_{k',k,1}, \theta_{k,k,i+1}$ are assumed to be independent for all k', k, i, which provides a very strict wireless transmission path condition in the communication system 1.

The communication system 1 requires an initial training period from when the transmitting device 2 feeds back a part of weight matrix ($W_k$) to the receiving device 3 as the hopping pattern $P_k$ up to when the transmitting device 2 is ready to generate an appropriate signature wave signal $c_k(t)$ according to an actual wireless transmission path condition.

The communication system 1 assumes that the initial training period is $t < (N_f+1)T_f + \Delta_k + \tau_{k,k,1}$ as described above.

A steady bit error rate (BER) in the communication system 1 shown below is obtained after the initial training period, and during the steady period, the weight matrix $W_k$ is updated only on the receiving device 3-k side and the hopping pattern $P_k$ is not fed back to the transmitting device 2-k.

Moreover, reference data $d''_k$ used to update the weight matrix $W_k$ is assumed to be $d''_k = d_k$ during the initial training period, which means that a pilot data symbol used during the initial training period is stored in the transmitting device 2 and the stored pilot data symbol is to be used during the initial training period.

The BER performance slightly depends on a randomly selected value $\tau_{k',k,1}, \theta_{k,k,i+1}$, and thus points in the graphs in the following drawings are each an average of the values obtained by five simulations.

The simulation conditions for other assumptions as well as the above assumptions are listed in the following Table 1.

TABLE 1

| | Communication system 1 | FCSS/DS-CDMA | DS-CDMA (MF, RAKE) |
|---|---|---|---|
| Data | | Differentially encoded QPSK | |
| $E_b/N_o$ | | 9.9 dB | |
| L | 7 | | 31 |
| α | 0, 7 | | 0, 31 | — |

TABLE 1-continued

| | Communication system 1 | FCSS/DS-CDMA | DS-CDMA (MF, RAKE) |
|---|---|---|---|
| M | 8 | | 1 |
| $T_f$ | | $10^4 T_s$ | — |
| $N_f$ | | 0, 10 | — |
| $\Delta_k$ | | Uniformly random distribution in [0, Tf] | — |
| Optimization algorithm | | N-LMS ($\mu = 0.1$) | — |

[Performance Evaluation Results by Simulation]

Hereinafter, results obtained by evaluating the performance of the communication system 1 by computer simulation will be described.

The computer simulation is carried out to compare the BER performance of the communication system 1 with the BER performance of a communication system which adopts the DS-CDMA using a conventional Gold sequence, uses a matched filter, and uses or does not use a RAKE combining method, and with the BER performance of a communication system adopting the FCSS/CDMA system.

Figure 11:
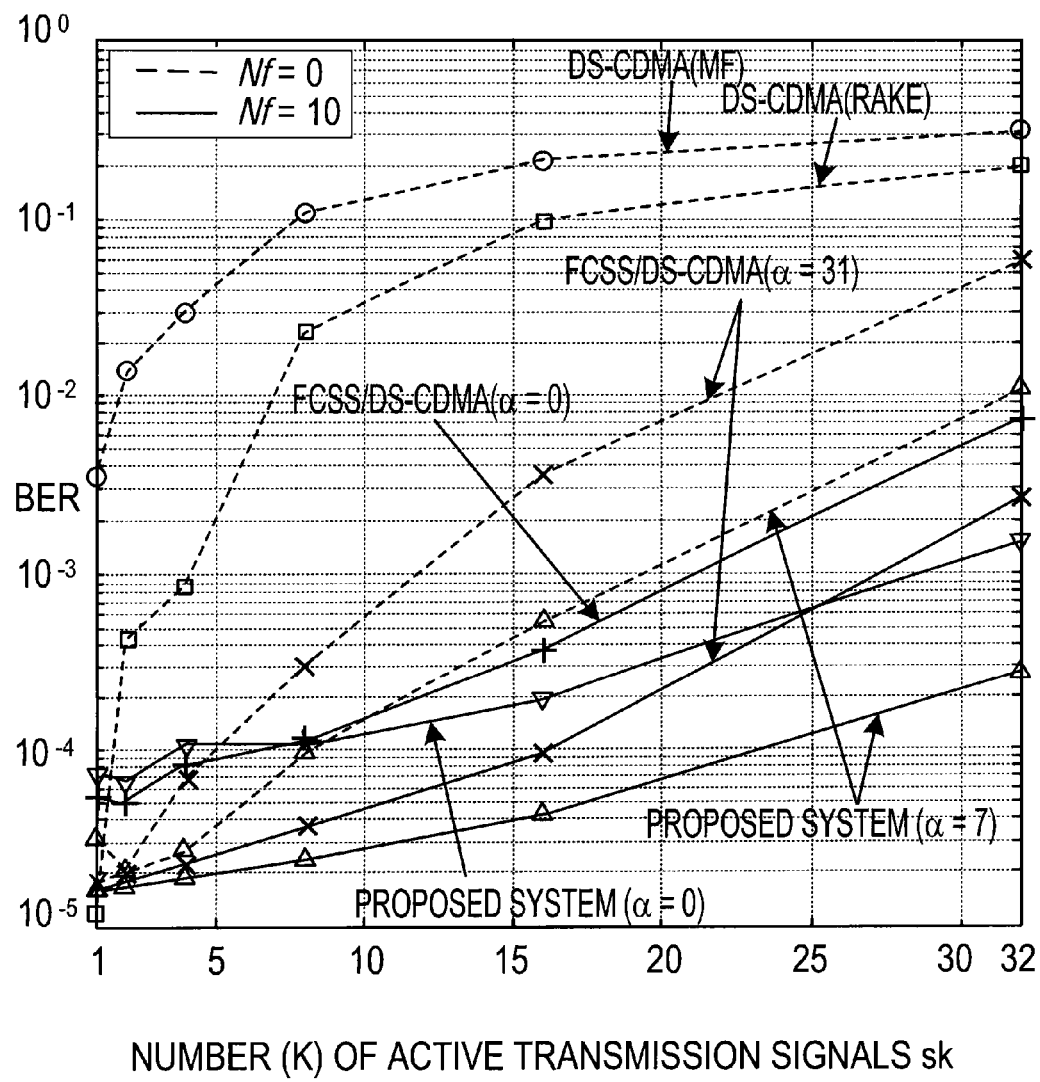
FIG. 11 is a graph of bit error rate performances with respect to the number of active transmission signals $s_k(t)$ in the communication system.

FIG. 11 is a graph of bit error rate performances with respect to the number of active transmission signals $s_k(t)$ in the communication system 1.

Figure 12:
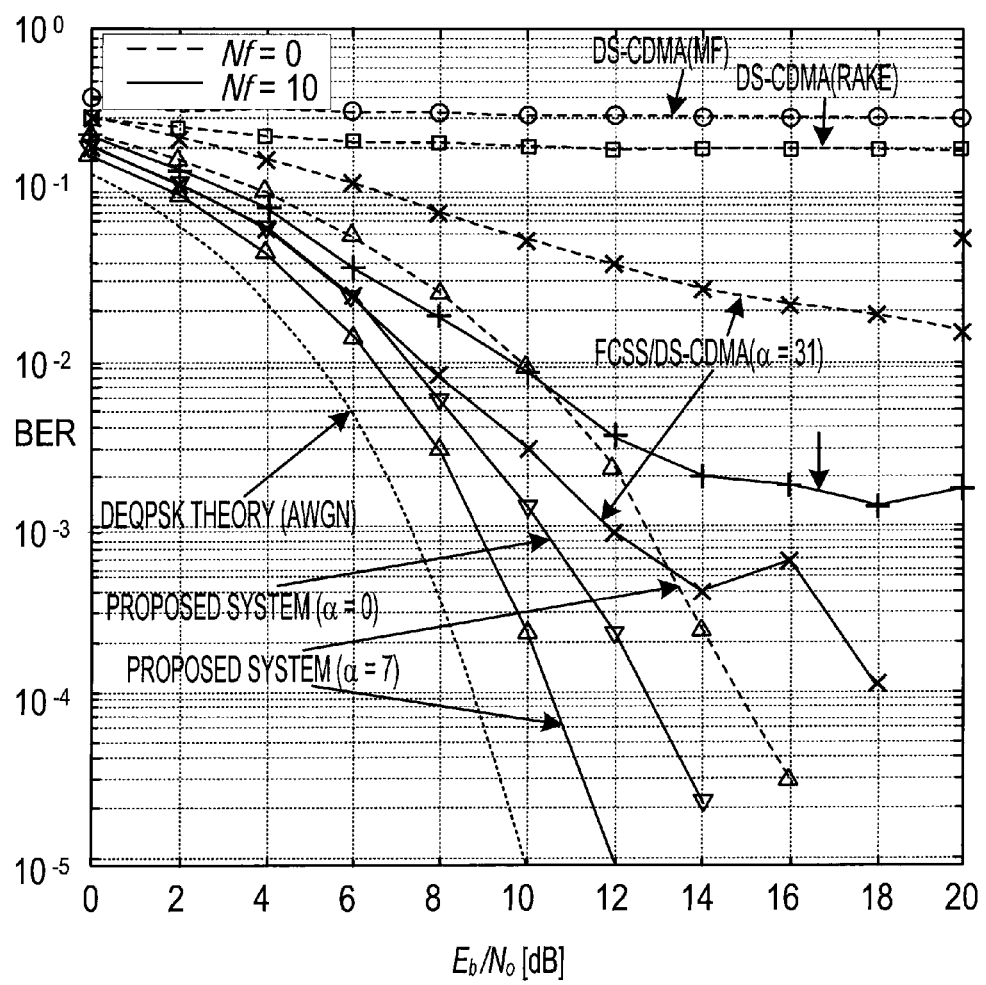
FIG. 12 is a graph of bit error rate performances with respect to $E_b/N_o$ for K=32.

FIG. 12 is a graph of bit error rate performances with respect to $E_b/N_o$ for K=32.

Figure 13D:
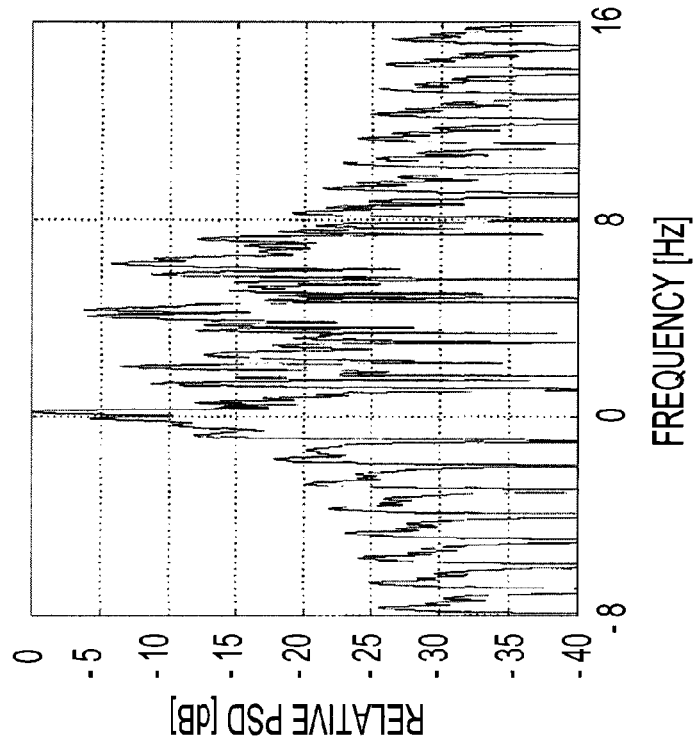

FIG. 13 is a diagram illustrating, in graph form, an initial hopping pattern, an updated hopping pattern, and corresponding power spectra.

Note that in FIG. 13, the tone level $p_{k,l,m}$ is indicated by an absolute value $|p_{k,l,m}|$ thereof.

As will be understood from FIG. 11, in a communication system adopting a conventional DS-CDMA system, as the number of active transmission signals $s_k(t)$ increases, the bit error rate increases rapidly.

In contrast thereto, in the communication system 1 where $\alpha$=7 and $N_f$=10, as the number of active transmission signals $s_k(t)$ increases, the error rate increases most gradually.

Moreover, as will be understood from FIG. 12, in comparison with the system adopting the FCSS/DS-CDMA ($\alpha$=31 and $N_f$=10), in the communication system 1 ($\alpha$=7 and $N_f$=10), a gain of 3 dB is obtained when the bit error rate is $10^{-3}$.

Figure 13C:
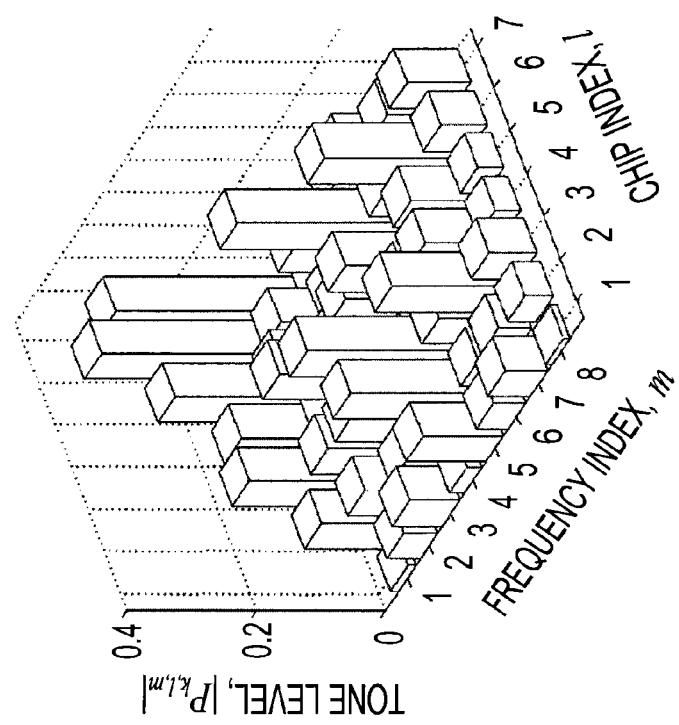

Moreover, as will be understood from FIG. 13C, an initial value $P_k(0)$ of the hopping pattern contains one tone for each chip, but the updated hopping pattern contains a plurality of tones for each chip.

Second Embodiment

First, before describing a second FC/MH-CDMA system to be presented as a second embodiment of the present application, improvements needed for the first FC/MH-CDMA system presented as the first embodiment will be described to promote understanding of the second FC/MH-CDMA system.

[Second Communication System 5]

Figure 14:
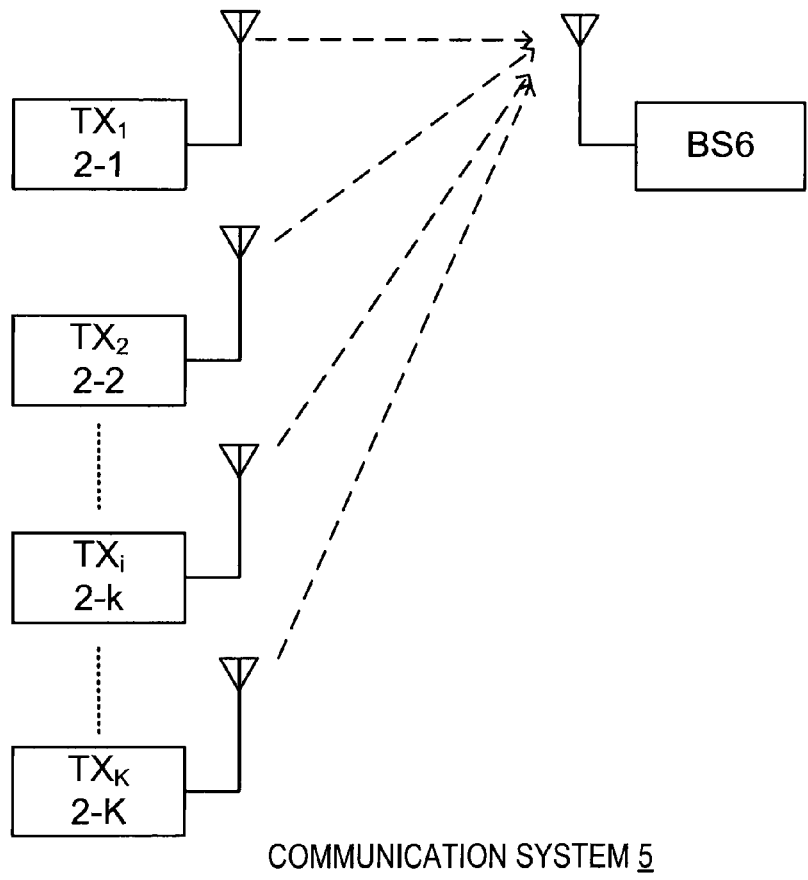
FIG. 14 illustrates a configuration of a second communication system according to a second embodiment of the present application.

FIG. 14 illustrates a configuration of a second communication system 5 according to a second embodiment of the present application.

As illustrated in FIG. 14, the second communication system 5 is configured such that a plurality of transmitting devices 2 correspond to the receiving device 3 in the first communication system 1 (FIG. 1), and accesses one or more base stations (BSs) 6 with similar hardware configurations as the transmitting device 2 and the receiving device 3 so as to transmit a transmission signal.

With the first FC/MH-CDMA system described above, a ratio of a transmission signal to a disturbing signal (a non-target transmission signal received by a pair consisting of a given transmitting device 2 and a receiving device 3 from another pair) and noise (SINR: Signal-to-Interference plus Noise Ratio) and a bit error rate (BER) in data decoded from a received transmission signal have been significantly improved.

However, in the first FC/MH-CDMA system, a ratio of peak power to average power (PAR: Peak-to-Average Ratio) in a transmission signal transmitted by the transmitting device 2 is not a controlled object.

A large peak-to-average ratio PAR results in a high power consumption by the transmitting device 2.

On the other hand, generally, forcedly reducing the peak-to-average ratio PAR when a plurality of transmitting devices 2 accesses a single communication system 5 as is the case of the communication system 5 illustrated in FIG. 14 may cause a bit error and may limit system performance such as the number of transmitting devices 2 capable of accessing the single communication system 5 (user capacity).

Therefore, in an FC/MH-CDMA system, it is essential to control bit error and the peak-to-average ratio of transmission signals so as not to affect the number of transmitting devices 2.

The second embodiment of the present application (the second FC/MH-CDMA system) described hereunder is an improvement of the first FC/MH-CDMA system and is configured such that iterative control of the peak-to-average ratio PAR can be performed between the transmitting device 2 and the communication system 5 (receiving device 3) in the second communication system 5 illustrated in FIG. 14 in the same manner as the progressive optimization of a hopping pattern in the first FC/MH-CDMA system.

It is needless to say that the second embodiment of the present application described hereunder can also be applied to the first communication system 1 illustrated in FIG. 1 in addition to the second communication system 5 illustrated in FIG. 14.

The second embodiment of the present application (the second FC/MH-CDMA system) is realized in the communication system 1 or 5 when, for example, the transmitting device 2 replaces the first transmitting program (FIG. 4) with a second transmitting program 40 to be described later with reference to FIG. 15 and executes the second transmitting program 24, and the receiving device 3 replaces the first receiving program 30 with a second receiving program 50 illustrated in FIG. 16 and executes the second receiving program 50 or the base station 6 executes the second receiving program 50.

Hereunder, a specific example will be described in which the second FC/MH-CDMA system is applied to the second communication system 5.

In addition, in order to avoid repetition of description, differences between the first and second embodiments will primarily be described for the second embodiment.

[Program of Transmitting Device 2 and Base Station 6 in Second Communication System 5]

Figure 15:
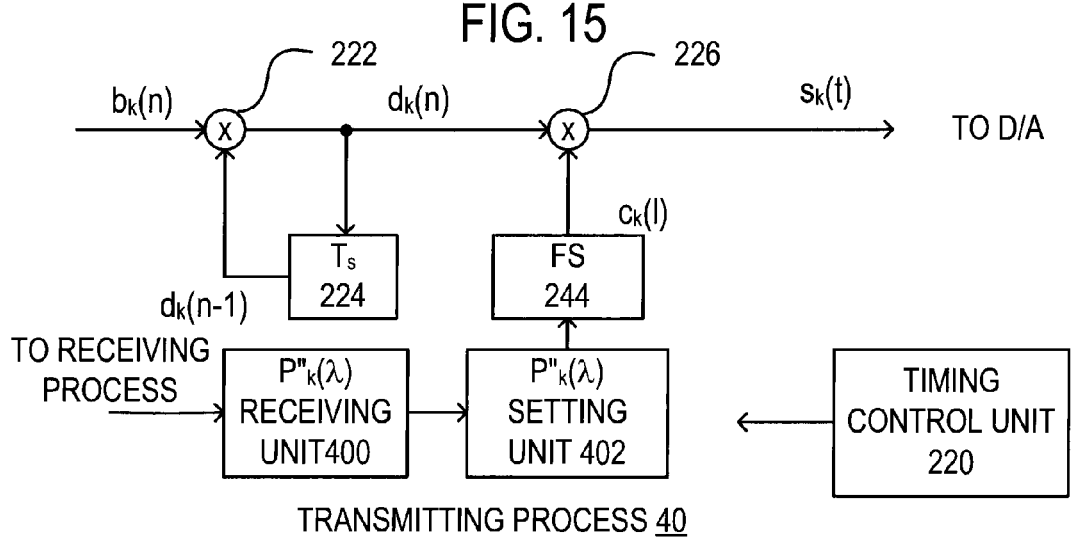
FIG. 15 illustrates a configuration of a second transmitting program executed by a transmitting device and a base station illustrated in FIG. 14.

FIG. 15 illustrates a configuration of the second transmitting program 40 executed by the transmitting device 2 and the base station 6 illustrated in FIG. 14.

Figure 16:
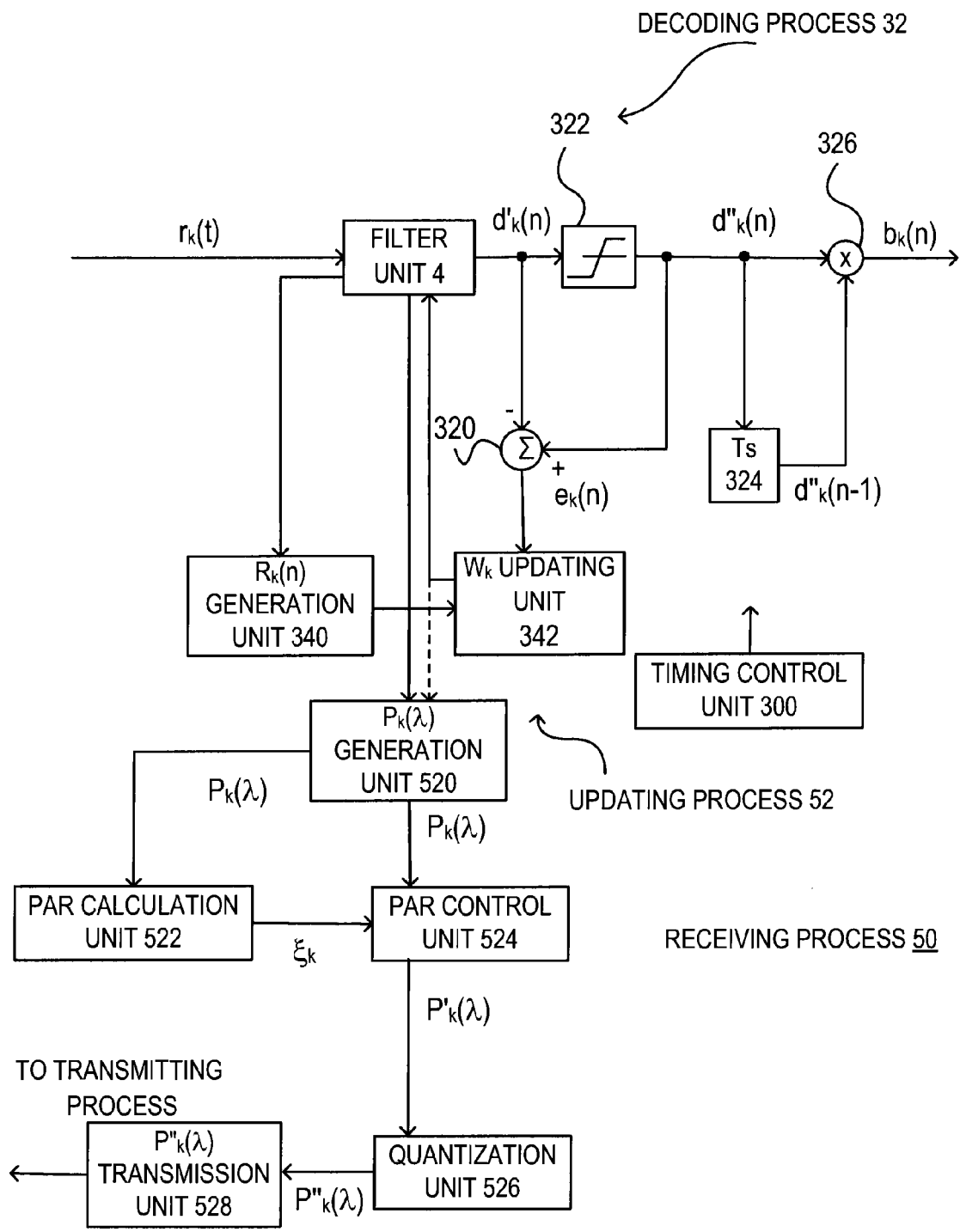
FIG. 16 illustrates a configuration of a second receiving program executed by a transmitting device and a base station illustrated in FIG. 14.

FIG. 16 illustrates a configuration of the second receiving program 50 executed by the transmitting device 2 and the base station 6 illustrated in FIG. 14.

As illustrated in FIG. 15, the second transmitting program 40 is configured such that the hopping pattern receiving unit 240 and the hopping pattern setting unit 242 of the first transmitting program 22 (FIG. 4) are respectively replaced by a second hopping pattern receiving unit 400 and a second hopping pattern setting unit 402 which perform similar operations.

The difference of the first hopping pattern receiving unit 240 and the first hopping pattern setting unit 242 from the second hopping pattern receiving unit 400 and the second hopping pattern setting unit 402 is that the first hopping pattern receiving unit 240 and the first hopping pattern setting unit 242 handle a hopping pattern $P_k$ (refer to expression 5 or the like given above) not processed for controlling the peak-to-average ratio PAR, and the second hopping pattern receiving unit 400 and the second hopping pattern setting unit 402 handle a hopping pattern $P''_k$ processed for controlling the peak-to-average ratio PAR, to be described later with reference to FIG. 16.

As illustrated in FIG. 16, the second receiving program 50 is configured such that the first hopping pattern generation unit 344 and the first hopping pattern transmission unit 346 of the first receiving program 30 (FIG. 7) are replaced by an updating unit 52.

That is, in the second receiving program 50, the first hopping pattern generation unit 344 and the first hopping pattern transmission unit 346 of the first receiving program 30 are replaced by a second hopping pattern generation unit 520 and a second hopping pattern transmission unit 528, and a peak-to-average ratio (PAR) calculation unit 522, a PAR control unit 524, and a quantization unit 526 are added between the second hopping pattern generation unit 520 and the second hopping pattern transmission unit 528.

The difference between the first hopping pattern transmission unit 346 and the second hopping pattern transmission unit 528 is that the first hopping pattern transmission unit 346 transmits a hopping pattern $P_k$ for which the peak-to-average ratio PAR is not controlled, and the second hopping pattern transmission unit 528 transmits a PAR-controlled hopping pattern $P''_k(\lambda)$.

In the second embodiment, X denotes the number of loops to be described later with reference to FIG. 20. Hereinafter, the hopping pattern $P''_k(\lambda)$ will also be expressed as a hopping pattern $P''_k$ by omitting the $(\lambda)$.

In the same manner as the first hopping pattern generation unit 344 (FIG. 6), the second hopping pattern generation unit 520 extracts elements corresponding to the hopping pattern corresponding portion 422 among the weight matrix $W_k$ of the filter unit 4 (FIG. 7) of the first receiving program 30 at a predetermined timing.

Alternatively, as depicted by the dotted line in FIG. 16, every time the weight updating unit 342 updates the weight $w_k$, the hopping pattern generation unit 520 extracts elements corresponding to the hopping pattern corresponding portion 422 among the updated weight $w_k$.

In the same manner as the hopping pattern generation unit 344 (FIG. 6) of the first receiving program 30, the hopping pattern generation unit 520 extracts, from elements of the weight $w_k$ extracted as described above, a part of the weight matrix $W_k$ inputted from the filter unit 4 or the weight updating unit 342 corresponding to the hopping pattern corresponding portion 422 (FIG. 7) as represented by the expressions 19-1 and 19-2 given above to generate a new hopping pattern $P_k$ and outputs the new hopping pattern $P_k$ to the hopping pattern transmission unit 346.

The PAR calculation unit 522 calculates a PAR $\xi_k$ from an element of the weight $w_k$ inputted from the PAR control unit 524.

Here, a signature wave signal $c_k(t)$ in the following expression 29 is given by the above expression 2, while an lth chip wave $\alpha_{k,l}(t)$ in the above expression 2 is obtained by applying the above expression 3 to an element $p_k$ of the weight $w_k$.

In other words, as in the case of the first FC/MH-CDMA system, the PAR calculation unit 522 calculates a PAR $\xi_k$ occurring in a transmission signal transmitted by the transmitting device 2 based on the expression 2, the expression 3, and the following expression 29 or the like when a hopping pattern $P'_k$ is generated from elements of a weight $w_k$ acquired by the hopping pattern generation unit 520 without adjustment for PAR control and the hopping pattern $P'_k$ is used by the transmitting device 2.

[Expression 29]

$$PAR = \frac{\max_{0 \le t < T_s} |c_k(t)|^2}{\frac{1}{T_s} \int_0^{T_s} |c_k(t)|^2 dt}. \tag{29}$$

Based on a PAR value calculated by the PAR calculation unit 522, the PAR control unit 524 adjusts the hopping pattern $P_k$ inputted from the PAR calculation unit 522 and generates a hopping pattern $P'_k(\lambda)$ (hereinafter, the hopping pattern $P'_k(\lambda)$ will also be expressed as a hopping pattern $P_k$ by omitting the $(\lambda)$).

In other words, the PAR control unit 524 adjusts a value of an element of the generated hopping pattern $P_k$ to generate the hopping pattern $P'_k$ so that the PAR value of the transmission signal generated by the transmitting device 2 using the hopping pattern $P'_k$ either becomes lower than a PAR value determined in advance to prevent adverse effects on the transmission of transmission signals in the communication system 1 and 5 (FIG. 1, FIG. 14) or becomes minimum in a range without any adverse effects on the transmission of transmission signals.

Processing by the PAR control unit 524 will now be described more specifically.

As described above, the hopping pattern $P_k$ ($P'_k$) is expressed in matrix (expressions 19-1 and 19-2) form.

While a simple FH signal (an FH signal in which only one tone among tones of different frequencies exist in each chip at equal amplitude levels) offers an optimal PAR (=0 dB), a simple FH signal is not necessarily well-suited for asynchronous transmission and transmission of a transmission signal via a wireless transmission path having a multipath and may result in MAI and ISI.

The hopping pattern $P'_k$ is updated by the base station 6 by setting a hopping pattern $P'_k(0)$ resistant to MAI and ISI as an initial value, and for a $\lambda$th feedback of the hopping pattern $P'_k$ from the base station 6 to the transmitting device 2, finding a next hopping pattern $P'_k(\lambda)$ that approximates an immediately previous hopping pattern $P'_k(\lambda-1)$ and which gives a smaller PAR than the immediately previous hopping pattern $P'_k(\lambda-1)$.

Although the hopping pattern $P'_k(\lambda)$ updated by the base station 6 gives a smaller PAR to a transmission signal when used by the transmitting device 2 in comparison to the hopping pattern $P_k$ prior to control by the PAR control unit 524, the hopping pattern $P'_k(\lambda)$ may slightly worsen the MAI and ISI of the transmission signal.

However, in such a case, the base station 6 adjusts the weight $w_k$ of the filter unit 4 so as to improve the MAI and the ISI of a transmission signal. Therefore, due to a next $\lambda+1$th feedback, the MAI and ISI are to be improved when the transmitting device 2 generates a transmission signal using a next hopping pattern $P'_k(\lambda+1)$.

By repetitively updating the hopping pattern in this manner, a hopping pattern $P'_k$ that gradually optimizes the PAR, MAI, and ISI of a transmission signal generated by the transmitting device 2 can be progressively obtained.

When a transmission signal is to be transmitted between the base station 6 and a plurality of transmitting devices 2, the base station 6 updates hopping patterns $P'_k$ respectively corresponding to the plurality of transmitting devices 2.

In addition, by arranging each of the PAR control units 524 of the plurality of transmitting devices 2 and the receiving device 3 to independently perform PAR control, the second FC/MH-CDMA system can also be applied without modification to the first communication system 1 (FIG. 1).

Figure 17:
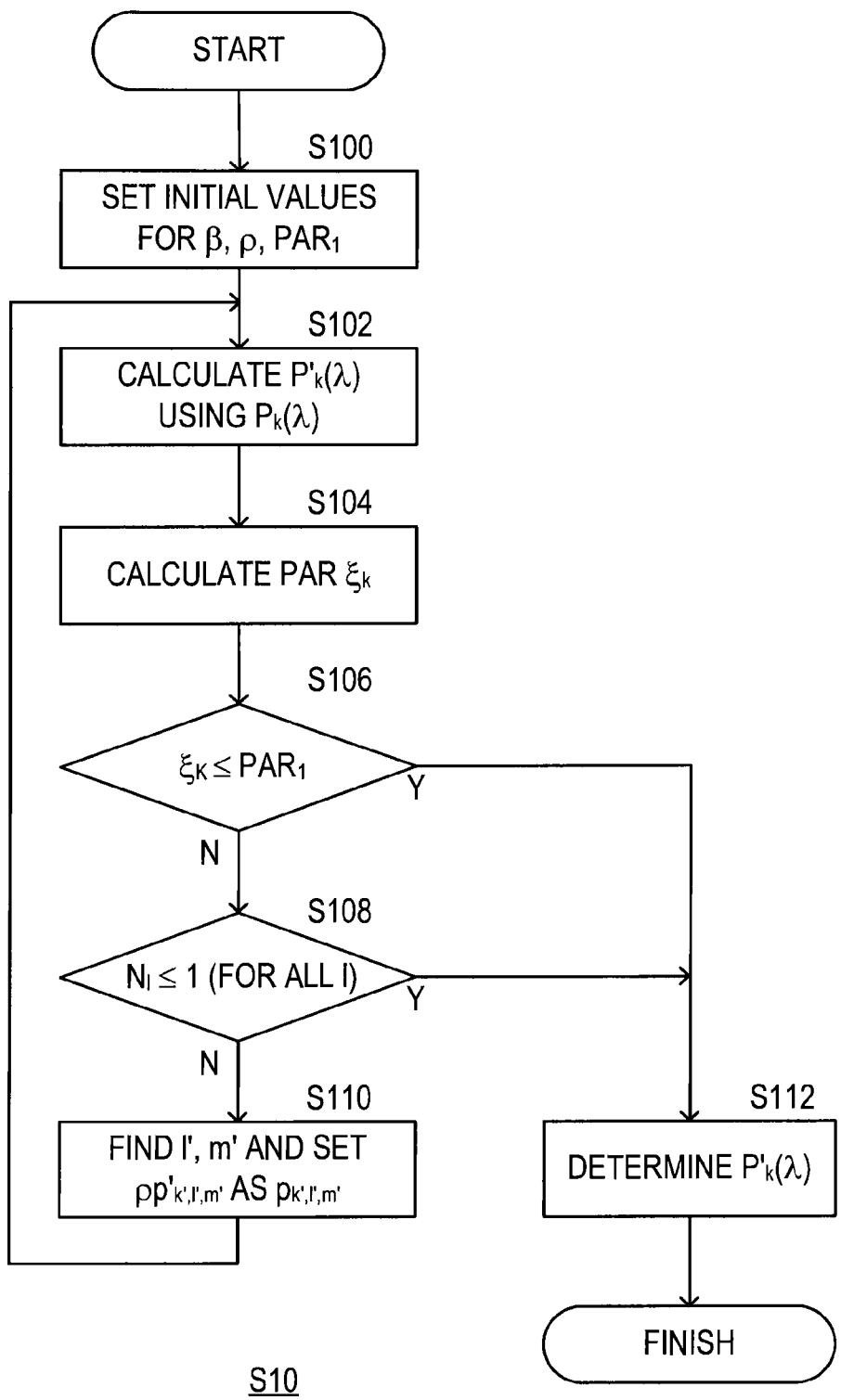
FIG. 17 is a flow chart illustrating processing (S10) performed by a hopping pattern generation unit, a PAR calculation unit, and a PAR control unit illustrated in FIG. 16.

FIG. 17 is a flow chart illustrating processing (S10) performed by the hopping pattern generation unit 520, the PAR calculation unit 522, and the PAR control unit 524 illustrated in FIG. 16.

As illustrated in FIG. 17, in step 100 (S100), the second receiving program 50 sets initial values of a constant β and a constant ρ (0≦ρ≦1) which are positive real numbers and a target value $PAR_1$ of PAR.

The values of the constants β and ρ are related to the magnitude of variance of the PAR value during the generation of the hopping pattern $P'_k$ by the PAR control unit 524 by adjusting the hopping pattern $P_k$ or, in other words, the magnitude of variance for reducing the PAR value increased by an (l', m': 1≦l'≦M, 1≦m'≦M)th element of the hopping pattern $P'_k$.

As will be described later with reference to FIG. 18 or the like, the initial values of the constants β and ρ are to be determined by calculation or simulation, from experience of a user of the communication system 5, by experimentation, or the like.

In step 102 (S102), the hopping pattern generation unit 520 generates a hopping pattern $P_k$ expressed by the following expression 30 as an L×M matrix having $P_{k,l}$, and $_m$ as elements from the inputted weight $w_k$.

[Expression 30]

$$p_{k,l,m} = \begin{cases} 0 & (|p_{k,l,m}| < \gamma) \\ p_{k,l,m} & (|p_{k,l,m}| \geq \gamma) \end{cases} \quad (30)$$

In the above expression 30, γ is a threshold to be used to reduce the number of tones included in a transmission signal generated by the transmitting device 2 by using a PAR-controlled hopping pattern $P'_k$ (quantized hopping pattern $P'''_k$), and is defined by the following expression 31.

[Expression 31]

$$\gamma = \beta \sqrt{\frac{1}{LM} \|P_k(\lambda)\|_F^2}, \quad (31)$$

In the above expression 31, β is a threshold to be normalized to a root-mean-square value (refer to the following expression 32) of an element of the hopping pattern $P_k$ in the above expression 31.

[Expression 32]

$$\sqrt{\frac{1}{LM} \|P_k(\lambda)\|_F^2} \quad (32)$$

In step 104 (S104), the PAR calculation unit 522 calculates PAR $\xi_k$ from either the hopping pattern $P_k$ generated by the hopping pattern generation unit 520 or the hopping pattern $P'_k$ whose element value has been adjusted by the PAR control unit 524 in processing thus far.

In step 106 (S106), the PAR control unit 524 determines whether or not the value of PAR $\xi_k$ calculated in the process of 5104 is equal to or below the target value PAR' set in 5100.

The receiving program 50 proceeds to the process of S112 when the value of PAR $\xi_k$ is equal to or below the target value $PAR_1$. Otherwise, the receiving program 50 proceeds to the process of 5108.

In step 108 (S108), the PAR control unit 524 determines whether or not the number of elements with values other than 0 respectively included in all rows of the hopping pattern $P_k$ inputted from the hopping pattern generation unit 520 or the hopping pattern $P'_k$ whose element value has been adjusted by the PAR control unit 524 in processing thus far is equal to or smaller than 1.

In other words, the PAR control unit 524 determines, for all L number of rows of the hopping pattern $P_k$, whether the number of elements $N_1$ taking a value other than 0 included in an lth (where 1≦l≦L) row of the hopping pattern $P_k$ is equal to or smaller than 1.

The receiving program 50 proceeds to the process of S112 when the number of elements taking a value other than 0 respectively included in all rows of the hopping pattern $P_k$ is equal to or smaller than 1. Otherwise, the receiving program 50 proceeds to the process of 5110.

In step 110 (S110), the PAR control unit 524 searches for and finds the number of an l'th (where 1≦l'≦L) chip (chip index l') that gives a maximum absolute amplitude value $|c'_k(t)|$ obtained from the hopping pattern $P'_k$. In addition, the PAR control unit 524 searches for and finds the number of a tone indicating that an absolute value $|p'_{k,l,m}|$ of an m'th (where 1≦m'≦M) element tone in an l'th chip is minimal (tone index m', indicating the number of a minimal tone other than 0 among a plurality of tones constituting a chip denoted by the aforementioned chip number l' having a maximum amplitude level).

Furthermore, the PAR control unit 524 multiplies an element $p'_{k,l',m'}$ indicated by the chip index l' and the tone index m' found as described above by the constant ρ, sets $\rho p'_{k,l',m'}$ as a new $p_{k,l',m'}$, and returns to the process of 5102.

In step 112 (S112), the PAR control unit 524 sets the hopping pattern $P'_k$ obtained by processing thus far as a PAR-controlled hopping pattern $P'_k$.

Significant parts of the process of S10 illustrated in FIG. 17 will be further described.

In the process of S10 illustrated in FIG. 17, since a determination in the process of 5106 that the value of PAR $\xi_k$ is equal to or below the target value $PAR_1$ set in S100 signifies that an object of PAR control has been achieved, the process of S10 is concluded.

In addition, when the value of PAR $\xi_k$ is not determined in the process of 5106 to have become equal to or smaller than the target value $PAR_1$ set in S100, in the process of S108, a determination is made on whether or not all of the L number of chips are constituted by zero or one tones.

When a determination is made in the process of S108 such that all of the L number of chips are constituted by zero or one tones, the process of S10 is terminated.

Conversely, when a determination is made in the process of 5108 such that any of the L number of chips are constituted by two or more tones, the process of 5110 is performed.

In the process of 5110, a chip having a maximum amplitude level and causing an increase in the PAR is found, and the value of a minimum tone among the plurality of tones constituting the chip is multiplied by ρ so as to be reduced.

By gradually reducing the value of minimum tones in this manner, basically, the number of tones included in the chip gradually becomes one.

By further reducing the value of a minimum tone in this manner, a change for reducing a tone with a large value so as to improve the MAI and ISI of a transmission signal is not performed in the updated hopping pattern P'$_k$. Moreover, a next hopping pattern P'$_k$ approximated to the immediately previous hopping pattern P'$_k$ is to be obtained by an update.

The quantization unit 526 (FIG. 16) quantizes the hopping pattern P'$_k$ generated by the PAR control unit 524 and controlled with respect to PAR, and outputs a quantized hopping pattern P''$_k$ to the hopping pattern transmission unit 528.

The hopping pattern transmission unit 528 respectively transmits the quantized hopping pattern P''$_k$ via wireless communication lines between the transmitting device 2 and the receiving device 3 to the transmitting devices 2 accessing the receiving device 3.

Quantization performed by the quantization unit 526 will be further described.

Quantization by the quantization unit 526 is performed so as to reduce the amount of data of the hopping pattern P''$_k$ to be transmitted from the base station 6 to each transmitting device 2 in the second communication system 5 illustrated in FIG. 14.

If a maximum absolute value of a real number part and an imaginary number part of an element of the hopping pattern P'$_k$ generated by the PAR control unit 524 is denoted by a maximum value $a_k^{max}$, then the maximum value $a_k^{max}$ is given by the following expression 33.

[Expression 33]

$$a_k^{max}(\lambda) = l, m^{max}[|Re[p'_{k,l,m}(\lambda)]|, |IM[p'_{k,l,m}(\lambda)]|] \quad (33)$$

Using the maximum value $a_k^{max}$, an element $p''_{k,l,m}$ of the hopping pattern P''$_k$ is given by the following expression 34.

Note that in the expression 34 below, $[x]_{round}$ indicates that the value of x is to be rounded to an integer value nearest to x, and (q+1) indicates the number of bits considered necessary to express the real number part and the imaginary number part of the element $p''_{k,l,m}$.

[Expression 34]

$$p''_{k,l,m}(\lambda) = \frac{a_k^{max}(\lambda)}{2^{q-1}} \left[ \frac{p'_{k,l,m} 2^{q-1}}{a_k^{max}(\lambda)} \right]_{round} \quad (34)$$

In other words, since (2q+1) bits' worth of data is considered necessary to respectively transmit the element P''$_{k,l,m}$ included in the hopping pattern P''$_k$ from the base station 6 to the transmitting devices 2, LM(2q+1) bits' worth of data is considered necessary to entirely transmit the single hopping pattern P''$_k$.

Transmission of the hopping pattern P''$_k$ in this manner is performed using quantization that is referred to as midtread quantization in which values after quantization include 0 (for example, values such as real number values −0.23 or +0.23 are quantized to 0) and is well-suited for a process for reducing the PAR in the second communication system 5.

Moreover, when midrise quantization in which values after quantization do not include 0 (for example, a real number value +0.23 is quantized to +1 and −0.23 is quantized to −1) is used in the process, PAR improvement is delayed in comparison to when midtread quantization is used.

[Overall Operation of Transmitting Device 2 and Base Station 9]

Hereinafter, an overall operation of data transmission between the transmitting device 2 and the base station 6, and a feedback and an update of the hopping pattern P''$_k$ according to the second communication system 5 will be described.

Reference will be made to FIG. 9 once again, only this time replacing the receiving device 3 with the base station 6.

In step 100-1 (S100-1), the transmitting device 2 (FIG. 15) transmits a transmission signal $s_k(t)$ to the base station 6 a plurality of number of times.

In step 102-1 (S102-1), at the base station 6, the hopping pattern generation unit 520 (FIG. 16) of the receiving program 50 updates a hopping pattern P$_k$.

Further, the PAR calculation unit 522 and the PAR control unit 524 adjusts the generated hopping pattern P$_k$ to control the PAR as described with reference to FIG. 17, and generates a hopping pattern P'$_k$ adjusted so as to control the PAR of the transmitting device 2.

The quantization unit 526 quantitizes the adjusted hopping pattern P'$_k$ to obtain a hopping pattern P''$_k$.

In step 104-1 (S104-1), the hopping pattern transmission unit 528 of the base station 6 transmits and feeds back the hopping pattern P''$_k$ to the transmitting device 2 via a wireless communication line.

In step 106-1 (S106-1), the hopping pattern receiving unit 400 (FIG. 15) of the transmitting device 2 receives the hopping pattern P''$_k$ transmitted from the base station 6, performs a process that is the opposite of the quantization performed by the PAR calculation unit 522 to obtain a new hopping pattern P'$_k$.

The hopping pattern setting unit 402 sets the new hopping pattern P'$_k$ to the filter unit 4 and uses the new hopping pattern P'$_k$ for subsequent spread spectrum.

The above described process is repeated, for example, N$_f$ number of times between the transmitting device 2 and the base station 6.

[Performance Evaluation Results by Simulation]

Hereinafter, results obtained by evaluating the performance of the communication systems 1 and 5 by computer simulation will be described.

[Premise of Performance Evaluation]

First, preconditions for a performance evaluation of the communication systems 1 and 5 will be described.

In the following performance evaluation, a case represented by items (1) and (2) below will be used as a specific example.

(1) The first communication system 1 includes K number of pairs of the transmitting device 2 and the receiving device 3 or the second communication system 5 includes a single base station 6 and K number of transmitting devices 2; and (2) Among the pairs and/or devices, a multipath wireless communication line made up of six paths exists (in other words, $I_{k',k}=6$ in the expression 7 described above).

In addition, the communication systems 1 and 5 are configured as specific examples such that attenuation characteristics are exponential attenuation characteristics, a relative intensity of an absolute value of a complex gain constant $|h_{k,i+1}|$ is 20 log 10 $|h_{k,i+1}|/|h_{k,i}|=-3$ dB ($i=1, 2, \ldots, I_k-1$), and a relative delay $\tau_{k,i}$ of the six paths of the wireless communication line is $\tau_{k,i+1}-\tau_{k,i}=(L+1) T_c/16$ ($\approx LT_c/16$, where $L=7$).

Further, the communication systems 1 and 5 are configured as specific examples such that $\tau_{k,l}$ and $\theta_{k,i}$ for all k and i are statistically independent of each other, and uniformly distributed random variables are respectively given in the intervals [0, Ts) and (0, 2π].

In the same manner as the first FC/MH-CDMA system, the second FC/MH-CDMA system requires a training period for the base station 6 (receiving device 3) to feed back a hopping pattern P″k to the transmitting device 2.

Hereinafter, an initial training period t is assumed to be $t<(N_f+1)T_f+\Delta_k+\tau_{k,1}$. For the communication systems 1 and 5, a BER is evaluated with respect to a steady period t ($\geq(N_f+1)T_f+\Delta_k+\tau_{k,1}$) after the initial training period t has elapsed.

PAR control as well as the generation and quantization of a hopping pattern P′$_k$ at the base station 6 (receiving device 3) are to be performed immediately before the base station 6 (receiving device 3) transmits the hopping pattern P″$_k$ to the transmitting device 2.

During a steady period, only an update of the weight $w_k$ of the filter unit 4 of the base station 6 (receiving device 3) is performed and the hopping pattern P″$_k$ is not fed back from the base station 6 (receiving device 3) to the transmitting device 2.

Moreover, during the updating period of the weight Wk of the filter unit 4, a message symbol b′$_k$(n) to be used for the update is equal to a message symbol $b_k$(n) (b′$_k$(n)=$b_k$(n)), signifying that the base station 6 (receiving device 3) side has prior knowledge of a pilot data symbol to be used during initial training.

Since BER and PAR have a certain degree of association with each other when $\tau_{k,l}$ and $\theta_{k,l}$ are randomly selected, average values of ten simulations are displayed as the performance evaluation result presented below.

The simulation conditions including the above assumptions are listed in the following Table 2.

TABLE 2

| Data | QPSK |
|---|---|
| $E_b/N_o$ | 9.6 dB |
| L | 7 |
| α | 7 |
| M | 8 |
| $T_f$ | $10^4 T_s$ |
| $N_f$ | 10 |
| $\Delta_k$ | Uniform distribution in [0, Tf] |
| Adaptive algorithm | N-LMS (μ = 0.1) |

[Parameters]

Next, parameters for the performance evaluation of the communication systems 1 and 5 will be described. The second FC/MH-CDMA system is designed so as to be capable of effectively controlling the PAR of a signature wave $c_k(t)$.

As described earlier with respect to FIG. 17, in the second FC/MH-CDMA system, three design constants β, ρ, and PAR$_1$ must be appropriately set.

The constants β, ρ, and PAR$_1$ are to be used in the loop in the process illustrated in FIG. 17. In the following performance evaluation, the values of the constants β, ρ, and PAR$_1$ are examined and determined based on the number of loop processes until a steady state is reached.

Figure 18:
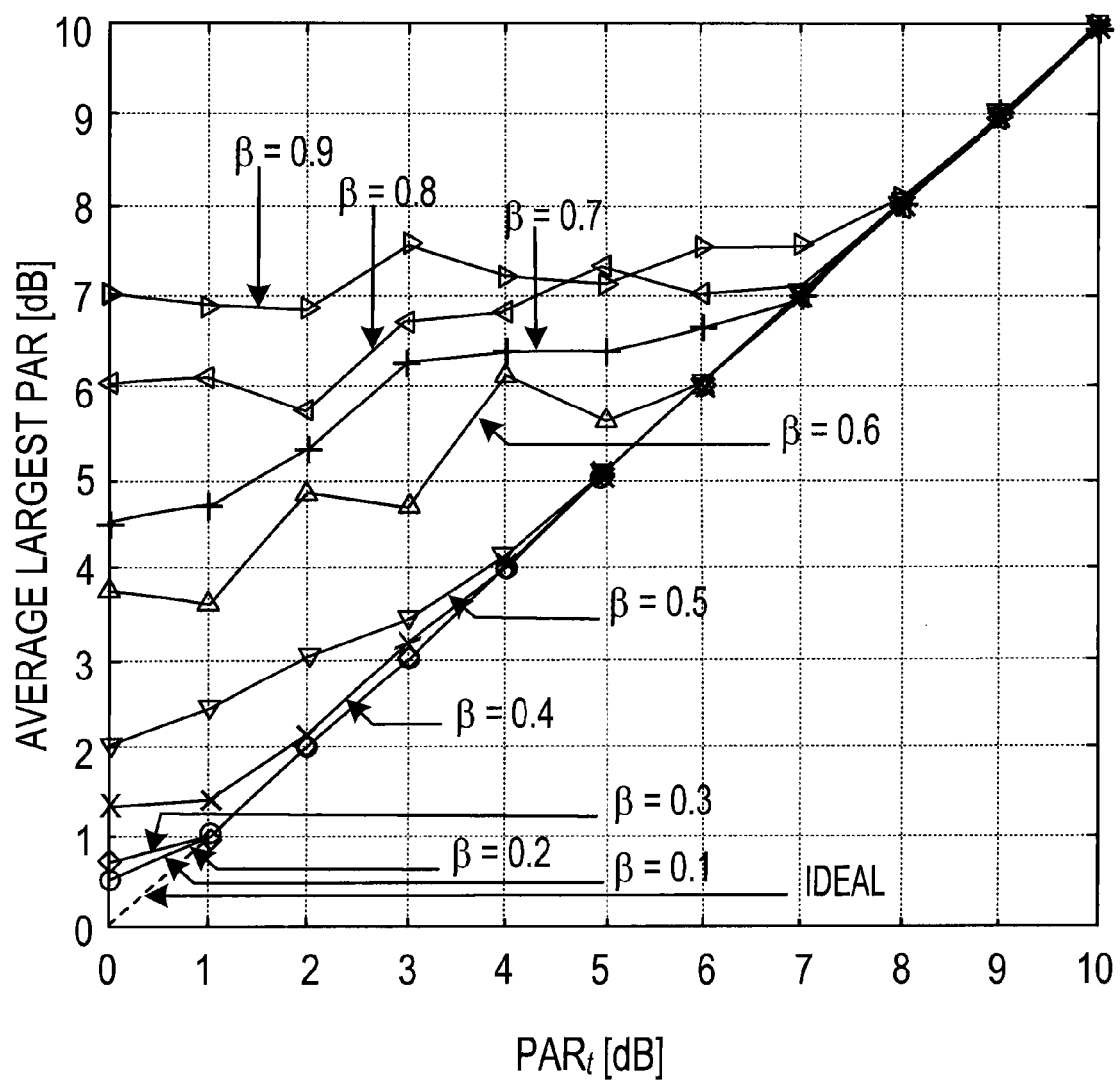
FIG. 18 illustrates a relationship between an average largest PAR and a PAR target value $PAR_1$ obtained by setting a constant $\rho$ to 0.9 and varying a constant $\beta$ when a transmission signal is transmitted via 32 wireless communication lines (K=32) in the communication systems illustrated in FIGS. 1 and 14.

FIG. 18 illustrates a relationship between an average largest PAR and a PAR target value PAR$_1$ obtained by setting a constant ρ to 0.9 and varying a constant β when a transmission signal is transmitted via 32 wireless communication lines (K=32; the same applies to each subsequent drawing) in the communication systems 1 and 5 illustrated in FIGS. 1 and 14.

In FIG. 18, an average largest PAR indicates an average value of maximum values of PAR generated in 32 signature waves $c_k(t)$ when using a hopping pattern P″k obtained by ten simulations (λ=10).

As is apparent from referring to FIG. 18, when constant ρ=0.9 in the second FC/MH-CDMA system, if constant β≦0.3, an actual PAR value and the target value PAR′ approximate each other in a favorable range of target value PAR$_1$>1 dB.

Figure 19:
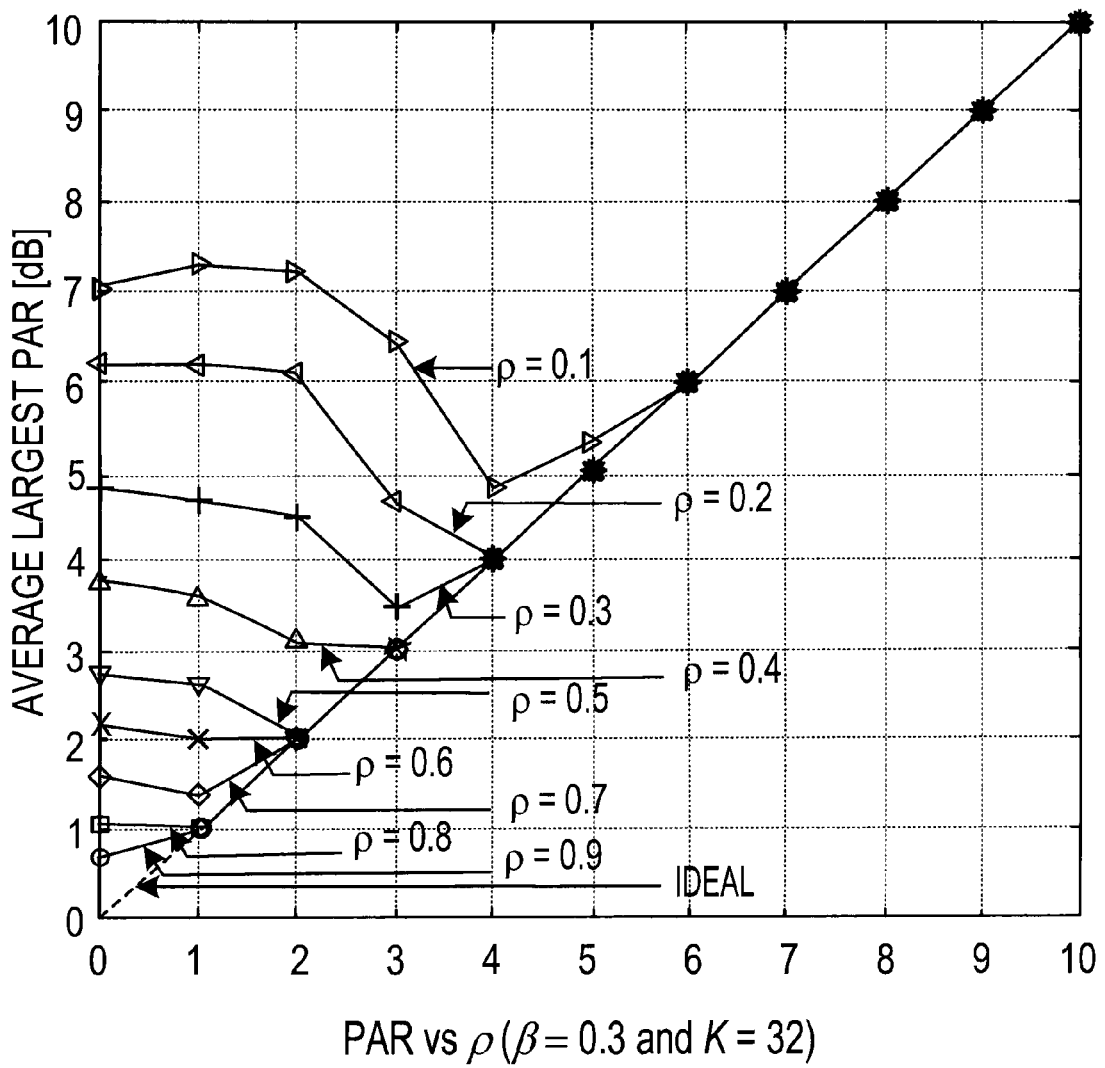
FIG. 19 illustrates a relationship between an average largest PAR and a PAR target value $PAR_1$ obtained by setting the constant $\beta$ to 0.3 and varying the constant $\rho$ when a transmission signal is transmitted via 32 wireless communication lines (K=32) in the communication systems illustrated in FIGS. 1 and 14.

FIG. 19 illustrates a relationship between the average largest PAR and the PAR target value PAR$_1$ obtained by setting the constant β to 0.3 and varying the constant ρ when a transmission signal is transmitted via 32 wireless communication lines (K=32) in the communication systems 1 and 5 illustrated in FIGS. 1 and 14.

As is apparent from referring to FIG. 19, when constant β=0.3 in the second FC/MH-CDMA system, if constant ρ≧0.8, an actual PAR value and the target value PAR$_1$ approximate each other in a favorable range of target value PAR$_1$>1 dB.

Figure 20A:
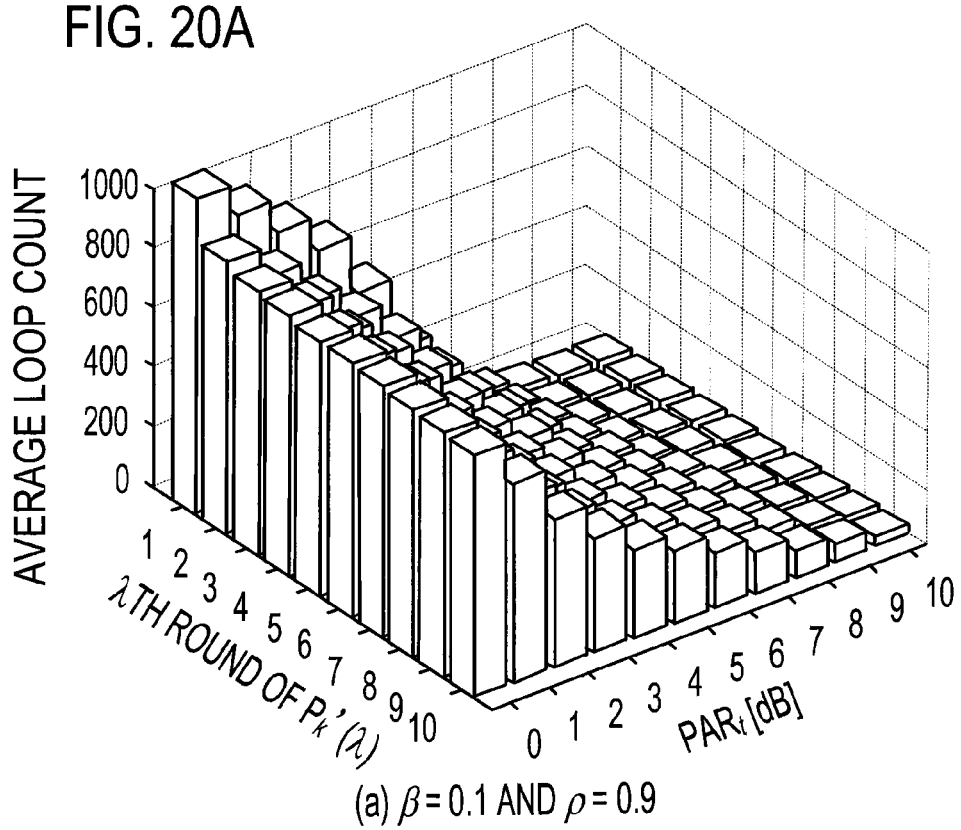
FIG. 20A is a histogram illustrating a relationship between the number of executions of the processing loop illustrated in FIG. 17, an average largest PAR, and a PAR target value $PAR_1$ when the constant $\beta$ is 0.1 and the constant $\rho$ is 0.9.
Figure 20B:
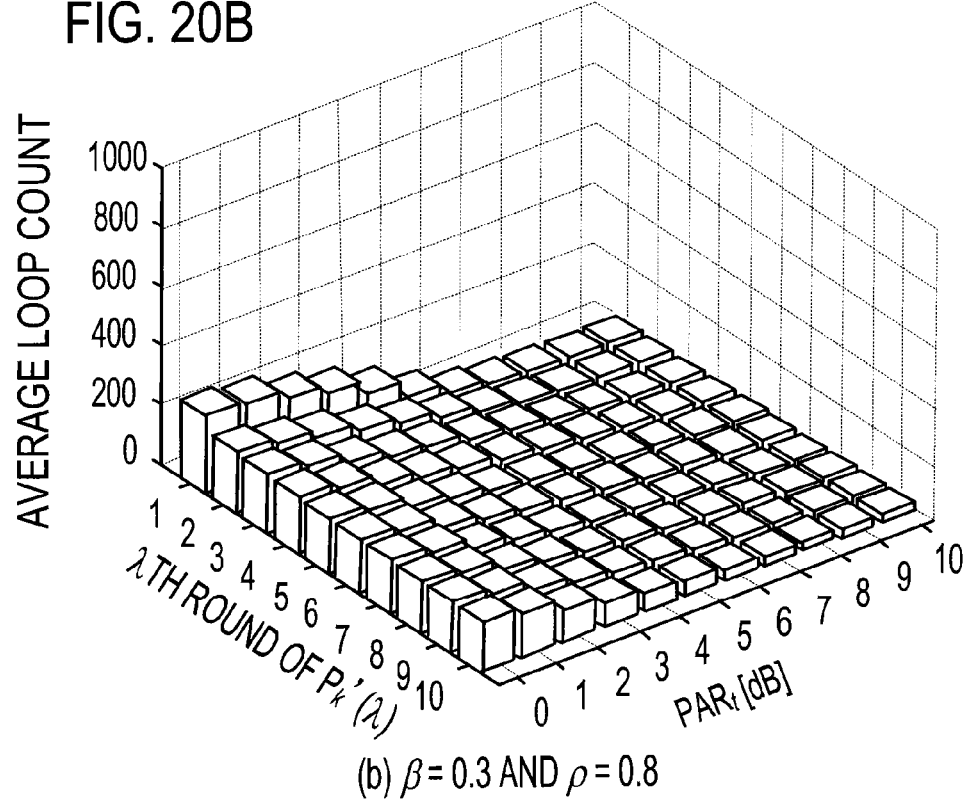
FIG. 20B is a histogram illustrating a relationship between the number of executions of the processing loop illustrated in FIG. 17, an average largest PAR, and a PAR target value $PAR_1$ when the constant $\beta$ is 0.3 and the constant $\rho$ is 0.8.

FIG. 20A is a histogram illustrating a relationship between the number of executions of the processing loop illustrated in FIG. 17, the average largest PAR, and the PAR target value PAR$_1$ when the constant β is 0.1 and the constant ρ is 0.9. FIG. 20B is a histogram illustrating a relationship between the number of executions of the processing loop illustrated in FIG. 17, the average largest PAR, and the PAR target value PAR$_1$ when the constant β is 0.3 and the constant ρ is 0.8.

As is apparent from referring to FIGS. 20A and 20B, in the second FC/MH-CDMA system, an actual PAR value can be kept within 1 dB of the target value PAR$_1$ both when constant β=0.1, constant ρ=0.9 and when constant β=0.3, constant ρ=0.8.

In addition, as is apparent from referring to FIGS. 20A and 20B, in the second FC/MH-CDMA system, by appropriately selecting the constants β and ρ, an amount of computation (the number of loops illustrated in FIG. 17) required by processes performed by the PAR calculation unit 522 and the PAR control unit 524 (FIG. 16) can be reduced significantly.

Assuming that the average largest PAR is smaller than the PAR target value PAR$_1$, a smaller constant β and a larger constant ρ can be selected. Such a selection can significantly reduce the amount of computation required by processes performed by the PAR calculation unit 522 and the PAR control unit 524.

In the following description, since a wide range is selectable as the target value PAR$_1$, a case where 0.3 is selected as the value of the constant β and 0.8 is selected as the value of the constant ρ is to be used as a specific example.

FIGS. 21A to 21E illustrate amplitudes of a signature wave $c_k(t)$ when a target value PAR$_1$ is varied from 1 dB to infinity (without PAR control).

As illustrated in FIGS. 21A to 21E, a square value $|c_k(t)^2|$ of the signature wave $c_k(t)$ is heavily dependent on the value of the target value PAR$_1$.

[BER Performance]

Figure 22A:
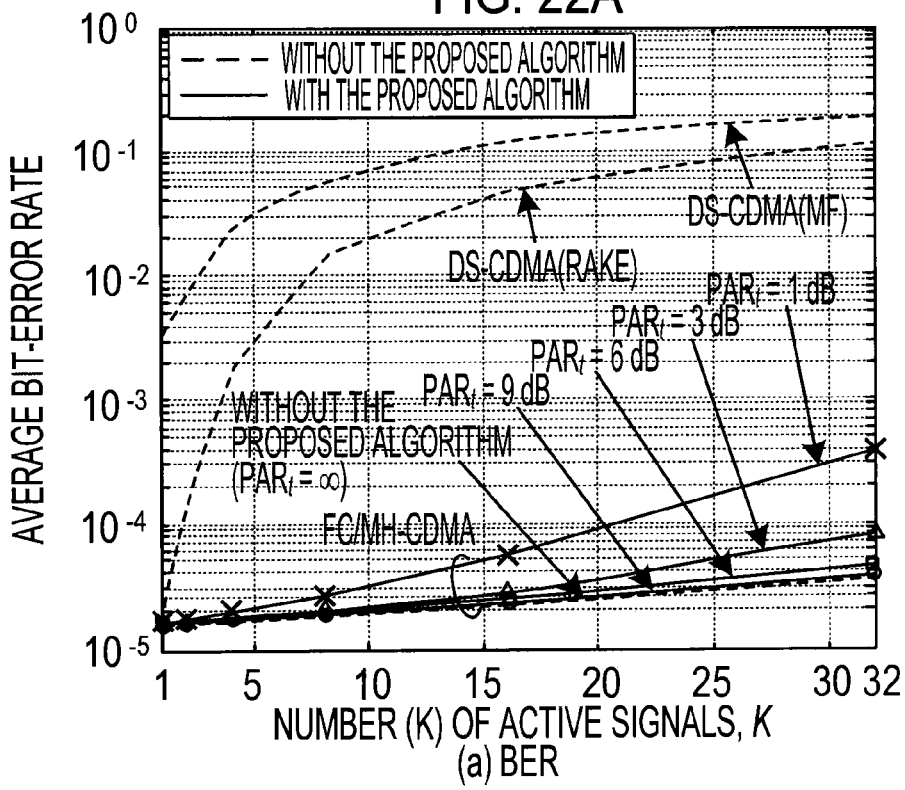
FIG. 22A illustrates BER performance and FIG. 22B illustrates a relationship between the number of transmission signals actually being transmitted and PAR.
Figure 22B:
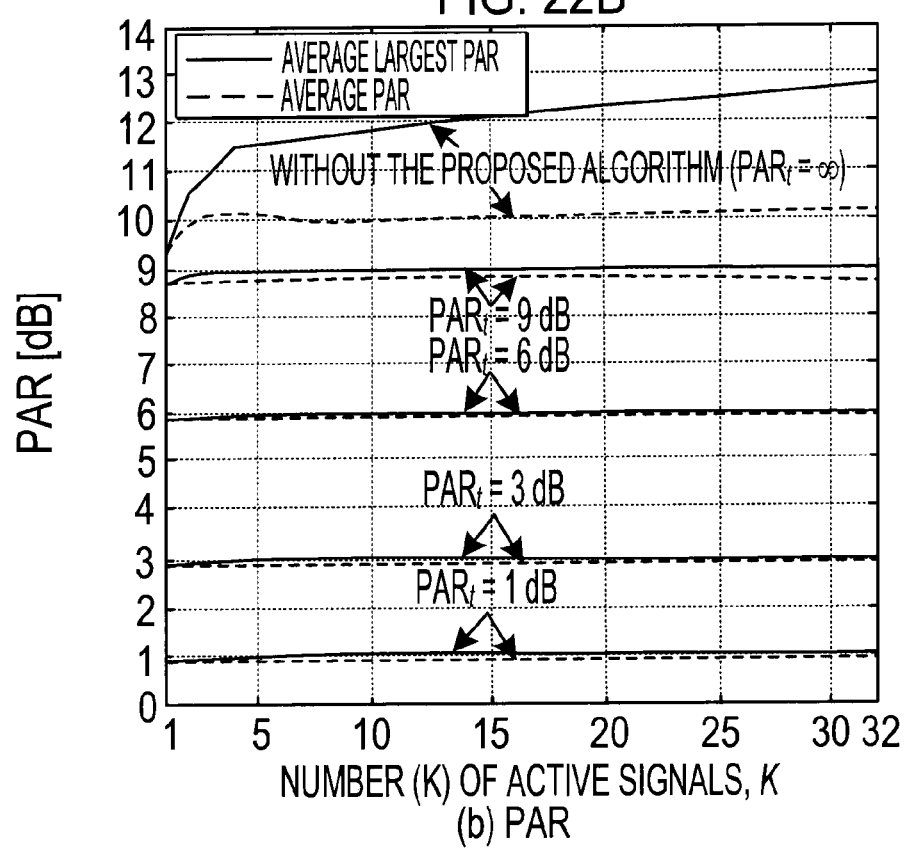

FIG. 22 illustrates characteristics obtained when applying the second FC/MH-CDMA system to the communication systems 1 and 5 illustrated in FIGS. 1 and 14, wherein FIG. 22A illustrates BER performance and FIG. 22B illustrates a relationship between the number of transmission signals actually being transmitted and PAR.

In the second FC/MH-CDMA system, the BER when a transmission signal is transmitted by selecting a plurality of target values $PAR_1$ is as illustrated in FIG. 22A.

FIG. 22A also illustrates, for a comparison with the second FC/MH-CDMA system, the BER performance of a conventional DS-CDMA system using a matched filter (MF) and adopting a random series when both using and not using a RAKE combining method involving six-finger maximal ratio combining.

As is apparent from referring to FIG. 22A, when the value of K is large or, in other words, when there are many transmission signals being transmitted, if the target value $PAR_1=1$ dB, 3 dB, then the BER performance deteriorates slightly in the second FC/MH-CDMA system.

On the other hand, when the target value $PAR_1=6$ dB, 9 dB, then an approximately ideal BER performance is obtained in the second FC/MH-CDMA system.

In addition, as is apparent from referring to FIG. 22B, PAR control is favorably performed regardless of the number (K) of transmission signals being transmitted in the second FC/MH-CDMA system.

[Effect of Quantization]

Figure 23:
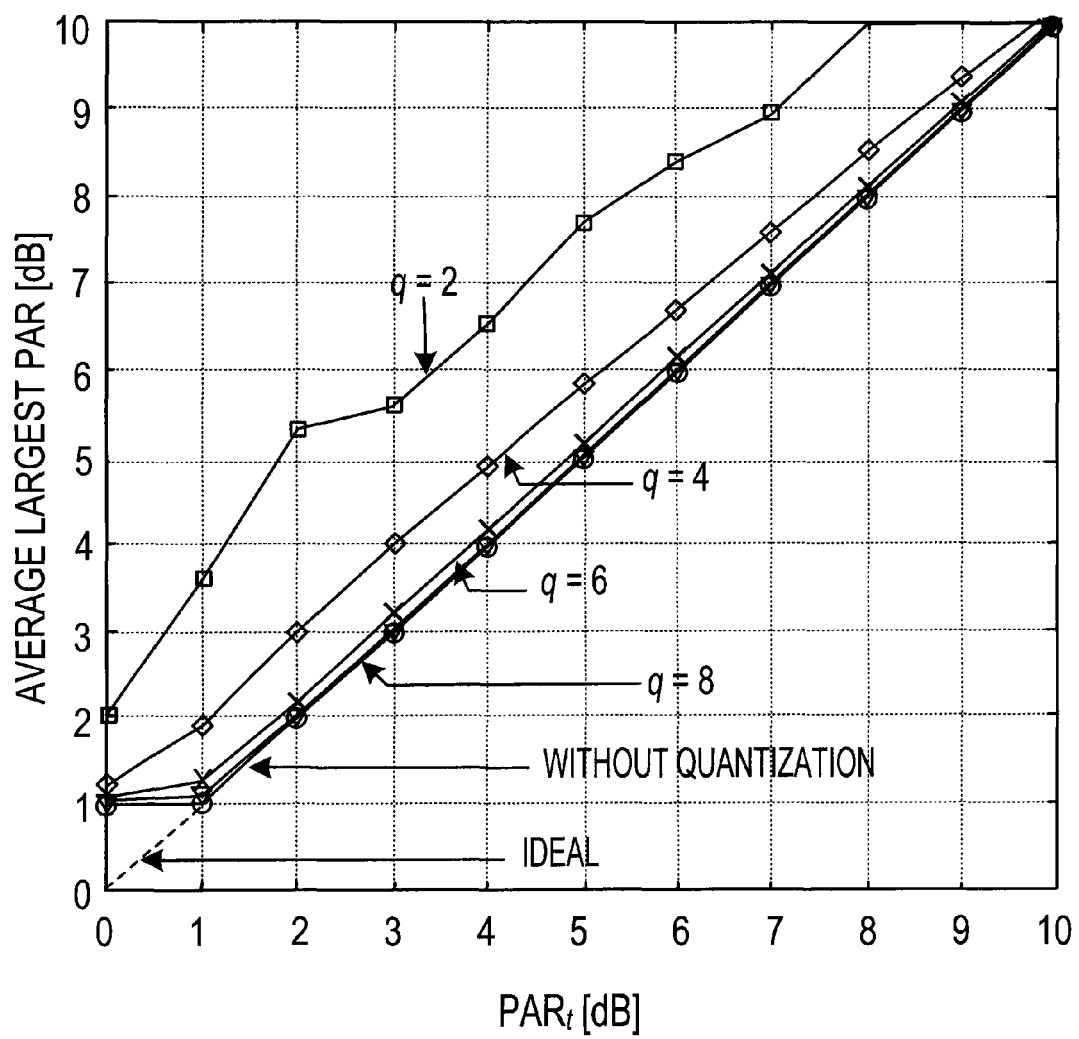
FIG. 23 illustrates a relationship between a target value $PAR_1$ and an average largest PAR obtained by varying respective quantization bit rates (q) of a real number part and an imaginary number part per tone when applying the second FC/MH-CDMA system to the communication systems illustrated in FIGS. 1 and 14.

FIG. 23 illustrates a relationship between a target value PAR1 and an average largest PAR obtained by varying respective quantization bit rates (q) of a real number part and an imaginary number part per tone when the second FC/MH-CDMA system is applied to the communication systems 1 and 5 illustrated in FIGS. 1 and 14.

As is apparent from referring to FIG. 23, when the second FC/MH-CDMA system is realized by applying a midtread quantization system as described earlier on the hopping pattern transmission unit 528 of the communication systems 1 and 5, best PAR control that is approximately equal to when not performing quantization can be realized by setting q 6.

Figure 24:
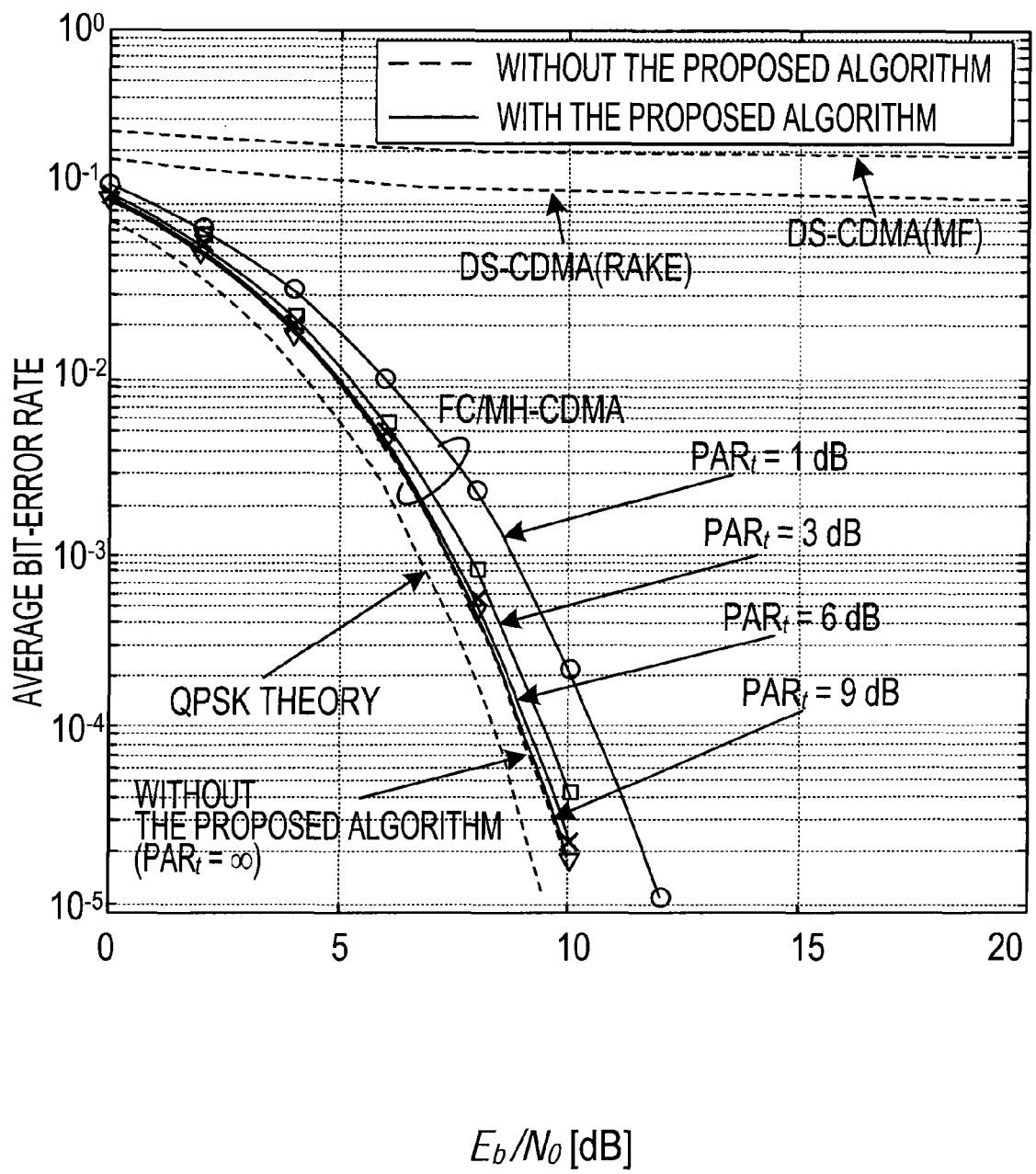
FIG. 24 illustrates a relationship between a signal/noise ratio ($E_0/N_0$) and an average largest PAR obtained by setting respective quantization bit rates (q) of a real number part and an imaginary number part per tone to 6 (q=6) when applying the second FC/MH-CDMA system to the communication systems illustrated in FIGS. 1 and 14.

FIG. 24 illustrates a relationship between a signal/noise ratio ($E_0/N_0$) and an average bit error rate obtained by setting respective quantization bit rates (q) of a real number part and an imaginary number part per tone to 6 (q=6) when the second FC/MH-CDMA system is applied to the communication systems 1 and 5 illustrated in FIGS. 1 and 14.

As illustrated in FIG. 24, in the second FC/MH-CDMA system, when the number of quantized bits is set to 6, a favorable BER performance can be obtained by setting the target value $PAR_1=1$ dB, 3 dB.

The above embodiments are provided for illustration and explanation purposes, and do not cover all embodiments of the present invention.

Moreover, the above embodiments are not intended to limit the technical scope of the present invention to the particular forms disclosed, and various modifications and variations can be made by referring to the particular forms disclosed.

Further, the above embodiments are selected and described so as to describe the principle and actual applications of the present invention in the most appropriate manner. Therefore, based on the particular forms disclosed in the above embodiments, those skilled in the art can use the present invention and the embodiments thereof by making various modifications to be suitable for every possible actual application.

Further, the technical scope of the present invention is intended to be defined by the description and the equivalents.

The present invention can be used for data transmission by spread spectrum.

What is claimed is:

1. A communication system for transmitting a transmission signal including:

a plurality of transmitting devices; and one or more receiving devices, the transmission signal being transmitted between the transmitting devices and the one or more receiving devices, and the transmission signal being obtained by spreading a transmission data into components of a predetermined first number of frequency domains and components of a predetermined second number of time domains, wherein, in a pair formed by one or more of the transmitting devices and one or more of the receiving devices, the one (or each) of the plurality of transmitting devices comprises a signal transmission unit for sequentially spreading, based on a spread pattern including a plurality of first elements defined with respect to the components of the first number of frequency domains and components of the second number of time domains and arranged so as to spread transmission data to the components of the frequency domains and the components of the time domains, the transmission data to the components of the frequency domains and the components of the time domains at each predetermined time interval, and transmitting the transmission data as a transmission signal, and an updating unit for updating, based on the spread pattern received from the receiving device, the spread pattern used to spread the transmission data; and the one or more receiving devices comprises a receiving unit for receiving the transmission signal, an expansion unit for sequentially expanding the received transmission signal into a plurality of second elements defined with respect to components of the frequency domains whose number is a third number that is equal to or greater than the first number and components of the time domains whose number is a fourth number that is greater than the second number at each of the predetermined time intervals, a processing unit for sequentially performing a process using a plurality of first coefficients defined for each of the second elements on the second elements obtained as a result of the expansion at each of the predetermined time intervals, a generation unit for generating new first coefficients using the processed second elements and the plurality of first coefficients, a selection unit for selecting a second coefficient corresponding to the spread pattern from among the new first coefficients, a ratio calculation unit for calculating a value indicating a ratio of a peak value of a transmission signal obtained when the selected second coefficient is set as the spread pattern in the one (or each) of the plurality of transmitting devices to an average value of the transmission signal, a pattern generation unit for generating the selected second coefficient as a new spread pattern when the value indicating the ratio satisfies a predetermined condition or when all elements included in the selected second coefficient satisfy a predetermined condition, and a pattern transmission unit for transmitting the new spread pattern to the one (or each) of the plurality of transmitting devices.

2. The communication system according to claim 1, wherein
the pair formed by one or more of the transmitting devices and one or more of the receiving devices includes
a plurality of the transmitting devices and
one of the receiving devices.

3. The communication system according to claim 1, wherein in the receiving device:
generation of a new first coefficient by the generation unit;
generation of the new spread pattern by the pattern generation unit; and
transmission of the new spread pattern by the pattern transmission unit are performed repeatedly.

4. The communication system according to claim 1, wherein
the pattern generation unit of the receiving device sets the selected second coefficient as the new spread pattern
when the value indicating the ratio is equal to or lower than a value determined in advance for the ratio or
when values of all elements included in the selected second coefficient are equal to or lower than a value determined in advance for the elements.

5. The communication system according to claim 4, wherein
the pattern generation unit of the receiving device adjusts the values of the elements included in the selected second coefficient to generate the new spread pattern
except
when either the value indicating the ratio is equal to or lower than a value determined in advance for the ratio or
when values of all elements included in the selected second coefficient are equal to or lower than a value determined in advance for the elements, and
the adjustment of the values of the elements included in the selected second coefficient is performed such that
the value indicating the ratio calculated by the ratio calculation unit from the second coefficient whose values of the elements have been adjusted becomes equal to or lower than the value determined for the ratio or
values of all elements included in the selected second coefficient become equal to or lower than the value determined for the elements.

6. The communication system according to claim 5, wherein
the second coefficient is expressed as a matrix constituted by the frequency components and the time domain, and
the adjustment of the values of the elements included in the selected second coefficient is performed by multiplying a maximum element among elements respectively included in the frequency component or the time domain of the matrix by a constant that is larger than 0 and smaller than 1 so that
the value indicating the ratio calculated by the ratio calculation unit from the second coefficient whose values of the elements have been adjusted becomes equal to or lower than the value determined for the ratio or
values of all elements included in the selected second coefficient become equal to or lower than the value determined for the elements.

7. The communication system according to claim 6, wherein
the expansion unit of the receiving device performs
a first expansion process of sequentially expanding the received transmission signal into third elements corresponding to the components of the frequency component at each of the time intervals and
a second expansion process of sequentially expanding the expanded third elements into the second elements corresponding to the components of the time domains at each of the time intervals.

8. The communication system according to claim 7, wherein
the first expansion process of the expansion unit of the receiving device expands the received transmission signal into the third elements by separating the signal into components of the frequency domains.

9. The communication system according to claim 8, wherein
the second expansion process of the expansion unit of the receiving device expands the third elements into the second elements by sequentially delaying expansion by the time interval at each of the time intervals.

10. The communication system according to claim 7, wherein
the first coefficient and the second elements are complex numbers, and
the processing unit of the receiving device performs
filtering on the transmission signal to obtain processing results through:
a multiplication process of sequentially multiplying each of the second elements by a complex conjugate number of the first coefficient corresponding to each of the second elements at each of the time intervals;
a first addition process of sequentially adding all the multiplication results corresponding to the components of the time domains at each of the time intervals; and
a second addition process of sequentially adding all the first addition results at each of the time intervals.

11. The communication system according to claim 1, wherein
the third number is equal to the first number, and
the selection unit of the receiving device
selects the first coefficient corresponding to the components of the first number of frequency components and the components of the second number of time domains from among the first coefficients as the second coefficient to generate the spread pattern.

12. The communication system according to claim 11, wherein
the second expansion process of the expansion unit of the receiving device expands the third elements into the second elements by sequentially delaying expansion by the time interval at each of the time intervals, and
the selection unit of the receiving device selects the first coefficient multiplied by the second number of the third elements from among the new first coefficients from the third elements starting from a most delayed coefficient, as the second coefficient to generate the spread pattern.

13. The communication system according to claim 11, wherein
the generation unit of the receiving device
generates the new first coefficient using a symbol of the transmission data determined from the processing results of the processing unit and the first coefficient.

14. The communication system according to claim 13, wherein
the generation unit of the receiving device
determines a symbol of the transmission data in a complex form from the processing results of the processing unit.

15. The communication system according to claim 14, wherein
the generation unit of the receiving device
subtracts the processing result of the processing unit from the symbol of the determined transmission data, processes the subtraction result and the first coefficient by a predetermined algorithm, and generates the spread pattern.

16. The communication system according to claim 1, wherein
based on the subtraction result, the generation unit generates the new spread pattern such that the symbol of the determined transmission data and the processing result by the processing unit approach each other.

17. The communication system according to claim 16, wherein
the generation of the first coefficient by the generation unit of the receiving device is performed repeatedly,
the predetermined algorithm is implemented through:
a process of generating a first matrix where a first coefficient used at a cycle of generation of the spread pattern is associated with components of the frequency domain and components of the time domain in a matrix form;
a process of generating a second matrix where the second elements are associated with the components of the frequency domain and the components of the time domain in a matrix form;
a process of calculating a norm of the generated second matrix;
a process of dividing a result of multiplication of the subtraction result, the second matrix, and a predetermined coefficient by a square value of the norm; and
a process of calculating a new first coefficient by adding the division result to the first coefficient used at a cycle of generation of the spread pattern.

18. A receiving device of a communication system including one or more pairs formed by one or more of a plurality of transmitting devices and one or more receiving devices for transmitting a transmission signal between one (or each) of the plurality of transmitting devices and the one or more receiving devices, the transmission signal being obtained by spreading a transmission data into components of a predetermined first number of frequency domains and components of a predetermined second number of time domains, one (or each) of the plurality of transmitting devices sequentially spreading, based on a spread pattern including a plurality of first elements defined with respect to the components of the first number of frequency domains and the components of the second number of time domains and arranged so as to spread transmission data to the components of the frequency domains and the components of the time domains, the transmission data to the components of the frequency domains and the components of the time domains at each predetermined time interval, transmitting the transmission data as a transmission signal, and updating, based on the spread pattern received from the receiving device, the spread pattern used to spread the transmission data, wherein
the one or more receiving devices comprises:
a receiving unit for receiving the transmission signal;
an expansion unit for sequentially expanding the received transmission signal into a plurality of second elements defined with respect to components of the frequency domains whose number is a third number that is equal to or greater than the first number and components of the time domains whose number is a fourth number that is greater than the second number at each of the predetermined time intervals;

a processing unit for sequentially performing a process using a plurality of first coefficients defined for each of the second elements on the second elements obtained as a result of the expansion at each of the predetermined time intervals;
a generation unit for generating new first coefficients using the processed second elements and the plurality of first coefficients;
a selection unit for selecting a second coefficient corresponding to the spread pattern from among the new first coefficients;
a ratio calculation unit for calculating a value indicating a ratio of a peak value of a transmission signal obtained when the selected second coefficient is set as the spread pattern in the transmitting device to an average value of the transmission signal;
a pattern generation unit for generating the selected second coefficient as a new spread pattern when the value indicating the ratio satisfies a predetermined condition or when all elements included in the selected second coefficient satisfy a predetermined condition; and
a pattern transmission unit for transmitting the new spread pattern to the one (or each) of the plurality of transmitting devices.

19. A communication method, in a pair formed by one or more of a plurality of transmitting devices and one or more receiving devices, for transmitting a transmission signal between the one (or each) of the plurality of transmitting devices and the one or more receiving devices, the transmission signal being obtained by spreading a transmission data into components of a predetermined first number of frequency domains and components of a predetermined second number of time domains,
wherein, based on a spread pattern including a plurality of first elements defined with respect to components of a predetermined first number of frequency domains and components of a predetermined second number of time domains and arranged so as to spread transmission data to the components of the frequency domains and the components of the time domains, one (or each) of the plurality of transmitting devices sequentially spreads the transmission data to the components of the frequency domains and the components of the time domains at each predetermined time interval and transmits the transmission data as a transmission signal, and based on the spread pattern received from the one or more receiving devices, updates the spread pattern used to spread the transmission data, and
the one or more receiving devices:
receives the transmission signal;
sequentially expands the received transmission signal into a plurality of second elements defined with respect to components of the frequency domains whose number is a third number that is equal to or greater than the first number and components of the time domains whose number is a fourth number that is greater than the second number at each of the time intervals;
sequentially performs a process using a plurality of first coefficients defined for each of the second elements on the second elements obtained as a result of the expansion at each of the time intervals;
generates new first coefficients using the processed second elements and the plurality of first coefficients;

selects a second coefficient corresponding to the spread pattern from among the new first coefficients;

calculates a value indicating a ratio of a peak value of a transmission signal obtained when the selected second coefficient is set as the spread pattern in one (or each) of the plurality of transmitting devices to an average value of the transmission signal;

generates the selected second coefficient as a new spread pattern when the value indicating the ratio satisfies a predetermined condition or when all elements included in the selected second coefficient satisfy a predetermined condition; and transmits the new spread pattern to one (or each) of the plurality of transmitting devices.

* * * * *

UNITED STATES PATENT AND TRADEMARK OFFICE
CERTIFICATE OF CORRECTION

PATENT NO. : 8,090,000 B2
APPLICATION NO. : 12/770281
DATED : January 3, 2012
INVENTOR(S) : Hamamura It is certified that error appears in the above-identified patent and that said Letters Patent is hereby corrected as shown below:

In the Drawings:

In Fig. 4, Sheet 4 of 23, delete "UNIT242" and insert -- UNIT 242 --, therefor.

In the Specifications:

In Column 4, Line 63, delete "($E_0/N_0$)" and insert -- ($E_b/N_0$) --, therefor.

In Column 11, Line 52, delete "$r_{k,m,L+\alpha-1}(n)$" and insert -- $r_{k,m,L+\alpha-1}(n)$ --, therefor.

In Column 12, Line 48, delete "$r_{k,m,L+\alpha}(n)$)," and insert -- $r_{k,m,L+\alpha}(n)$,-- , therefor.

In Column 14, Line 12, delete "$T_0$" and insert -- $T_c$ --, therefor.

In Column 15, Line 32, delete "$T_{k',k,i}$" and insert -- $\tau_{k',k,i}$ --, therefor.

In Column 16, Line 27, in Expression (9-2), delete "$r_k(t)e^{-j\frac{2\pi(m-1)}{Tc}}dt$" and insert -- $r_k(t)e^{-j\frac{2\pi(m-1)}{Tc}t}dt$ --, therefor.

In Column 17, Line 5, in Expression (12), delete "$d''k(n)=sgn[Re[d'_k(n)]]jsgn[Im[d'_k(n)]]$," and insert -- $d''k(n) = sgn[Re[d'_k(n)]] + jsgn[Im[d'_k(n)]]$ --, therefor.

Signed and Sealed this
Seventeenth Day of September, 2013

Teresa Stanek Rea
*Deputy Director of the United States Patent and TrademarkOffice*

CERTIFICATE OF CORRECTION (continued)
U.S. Pat. No. 8,090,000 B2

In Column 17, Line 65, delete "$//R_k(n)//_F$ in the expression 15" and insert -- $\|R_k(n)\|_F$ in the expression 16 --, therefor.

In Column 18, Line 18, delete "$0_{txM}T$" and insert -- $0_{\alpha xM}T$ --, therefor.

In Column 18, Line 20, in Expression (18), delete "$W_k(0)=[P_k^T(0)0_{\alpha xM}]^T$," and insert -- $\mathbf{W}_k(0) = [\mathbf{P}_k^T(0)\ \mathbf{0}_{\alpha \times M}^T]^T$ --, therefor.

In Column 19, Line 12, in Expression (21), delete "$\hat{\tilde{n}}_k$," and insert -- $\hat{\tilde{n}}_k \triangleq$ --, therefor.

In Column 22, Line 23, delete "$_{i-1}|/h_{k',k,i}|$" and insert -- $_{i+1}|/|h_{k',k,i}|$ --, therefor.

In Column 24, Line 43, delete "program" and insert -- program 22 --, therefor.

In Column 25, Line 38, delete "X" and insert -- $\lambda$ --, therefor.

In Column 26, Line 25, delete "$P_k$" and insert -- $P'_k$ --, therefor.

In Column 28, Line 17, delete "PAR' set in 5100." and insert -- $PAR_1$ set in S100. --, therefor.

In Column 28, Line 21, delete "5108." and insert -- S108. --, therefor.

In Column 28, Line 39, delete "5110." and insert -- S110. --, therefor.

In Column 28, Line 54, delete "5102." and insert -- S102. --, therefor.

In Column 28, Line 61, delete "5106" and insert -- S106- --, therefor.

In Column 28, Line 66, delete "5106" and insert -- S106 --, therefor.

In Column 29, Line 7, delete "5108" and insert -- S108 --, therefor.

In Column 29, Line 8, delete "5110" and insert -- S110 --, therefor.

In Column 29, Line 9, delete "5110," and insert -- S110, --, therefor.

CERTIFICATE OF CORRECTION (continued)
U.S. Pat. No. 8,090,000 B2

In Column 29, Line 39, delete "element" and insert -- element $p'_{k,l,m}$ --, therefor.

In Column 29, Line 45, in Expression (33), delete "$a_k^{max}(\lambda)=l,m^{max}[|Re[p'_{k,l,m}(\lambda)]|, |IM[p'_{k,l,m}(\lambda)]|]$," and insert -- $a_k^{max}(\lambda) = \max_{l,m}[|Re[p'_{k,l,m}(\lambda)]|, |Im[p'_{k,l,m}(\lambda)]|]$ --, therefor.

In Column 31, Line 28, delete "Wk" and insert -- $w_k$ --, therefor.

In Column 32, Line 11, delete "PAR'" and insert -- $PAR_l$ --, therefor.

In Column 33, Line 27, delete "PAR1" and insert -- $PAR_l$ --, therefor.

In Column 33, Line 38, delete "q 6.'" and insert -- $q \geq 6.$ --, therefor.

In Column 33, Line 40, delete "$(E_0/N_0)$" and insert -- $(E_b/N_0)$ --, therefor.